(12) United States Patent
Su et al.

(10) Patent No.: US 11,775,731 B2
(45) Date of Patent: Oct. 3, 2023

(54) STENCIL-AVOIDANCE DESIGN METHOD AND DEVICE, ELECTRONIC DEVICE AND STORAGE MEDIUM

(71) Applicant: VAYO (SHANGHAI) TECHNOLOGY CO., LTD., Shanghai (CN)

(72) Inventors: Pan Su, Shanghai (CN); Dujuan Li, Shanghai (CN); Shengjie Qian, Shanghai (CN); Jishuo Liu, Shanghai (CN)

(73) Assignee: VAYO (SHANGHAI) TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/009,804

(22) PCT Filed: May 31, 2021

(86) PCT No.: PCT/CN2021/097211
§ 371 (c)(1),
(2) Date: Dec. 12, 2022

(87) PCT Pub. No.: WO2022/057313
PCT Pub. Date: Mar. 24, 2022

(65) Prior Publication Data
US 2023/0205973 A1 Jun. 29, 2023

(30) Foreign Application Priority Data
Sep. 16, 2020 (CN) .......................... 202010974513.8

(51) Int. Cl.
*H05K 3/12* (2006.01)
*G06F 30/398* (2020.01)
(Continued)

(52) U.S. Cl.
CPC ......... *G06F 30/398* (2020.01); *H05K 3/0005* (2013.01); *H05K 3/1225* (2013.01); *G06F 2115/12* (2020.01)

(58) Field of Classification Search
CPC . G06F 30/398; G06F 2115/12; H05K 3/0005; H05K 3/1225
See application file for complete search history.

(56) References Cited

U.S. PATENT DOCUMENTS

| | | |
|---|---|---|
| 2007/0234262 A1 | 10/2007 | Uedi et al. |
| 2020/0100354 A1 | 3/2020 | Werner et al. |
| 2022/0147684 A1* | 5/2022 | Liu .......................... G06F 30/39 |

FOREIGN PATENT DOCUMENTS

| | | |
|---|---|---|
| CN | 110600402 A | 12/2019 |
| CN | 111191408 A | 5/2020 |

(Continued)

*Primary Examiner* — Nghia M Doan
(74) *Attorney, Agent, or Firm* — Global IP Services; Tianhua Gu

(57) ABSTRACT

A stencil-avoidance design method, a stencil-avoidance design device, an electronic device, and a non-transitory storage medium are provided. The method includes: obtaining a plurality of first regions and a plurality of first stencil aperture regions; determining whether a shortest distance between a selected first region of the plurality of first regions and a selected first stencil aperture region of the plurality of first stencil aperture regions is within a preset threshold range; further obtaining a second region and a second stencil aperture region if the shortest distance is within the preset threshold range, and then obtaining a third region; performing a collision step if a collision test is required, and obtaining a final stencil aperture region. The above method can improve the efficiency, accuracy, coverage, and comprehensiveness of the stencil avoidance design.

11 Claims, 14 Drawing Sheets

(51) Int. Cl.
*H05K 3/00* (2006.01)
*G06F 115/12* (2020.01)

(56) References Cited

FOREIGN PATENT DOCUMENTS

| | | |
|---|---|---|
| CN | 111291530 A | 6/2020 |
| CN | 112232014 A | 1/2021 |

* cited by examiner obtain a plurality of first regions and a plurality of first stencil aperture regions determine whether a shortest distance between a selected first region of the plurality of first regions and a selected first stencil aperture region of the plurality of first stencil aperture regions is within a preset threshold range, and using the selected first region as a second region and using the selected first stencil aperture region as a second stencil aperture region if the shortest distance is within the preset threshold range obtain a third region based on the second region determine whether the third region collides with the second stencil aperture region, and cropping the second stencil aperture region to obtain a third stencil aperture region if the third region collides with the second stencil aperture region obtain a final stencil aperture region according to a first area ratio, a width-to-thickness ratio, a second area ratio, and a size ratio of the third stencil aperture region, and a relationship between an area of the third stencil aperture region and an area of the second stencil aperture region

FIG. 1

STENCIL-AVOIDANCE DESIGN METHOD AND DEVICE, ELECTRONIC DEVICE AND STORAGE MEDIUM

CROSS REFERENCE TO RELATED PATENT APPLICATION

The present application is the US national stage of PCT/CN2021/097211 filed on 2021, May, 31, which claims the priority of the Chinese patent application No. 202010974513.8 filed on 2020, Sep. 16, which application is incorporated herein by reference.

TECHNICAL FIELD

The present disclosure relates to the field of printed circuit boards, and in particular, to a stencil-avoidance design method, a stencil-avoidance design device, an electronic device and a non-transitory storage medium.

BACKGROUND

With the development of electronic devices, concepts like Smart Factory are getting more and more popular throughout the manufacturing industry. As people's requirements for electronic devices are getting higher, functions of electronic devices are becoming more intelligent, and printed circuit boards (PCBs) of electronic devices are also becoming more complex, that is, there are more components on the PCBs of electronic devices. For the above reasons, requirements for printing processes and printing quality of PCBs are also getting more demanding. Although stencils are used as auxiliary materials in surface mounted technology (SMT) processes, the quality of stencil apertures directly determines the printing quality of PCBs.

In current SMT processes, SMT defects caused by printing account for more than 60% of total defects. Among them, the defects caused by poor stencil designs, that is, unreasonable stencil aperture designs, account for more than 35% of total defects. Therefore, stencil designs play a crucial role in the quality and productivity of SMT. In stencil designs, it is necessary to design stencil apertures in such a way that they meet different requirements. In practice, when designing stencil apertures, certain distances between stencil apertures and other features including through-holes, solder resist regions, profiles (outer frames of the PCB), and device bodies of the PCB are needed so that the other features are able to "avoid" the stencil apertures; in other words, "avoidance" analysis of stencil apertures is needed in order to achieve the distances required by the SMT processes. Traditionally, avoidance analysis of stencil apertures is done manually with the naked eye, which makes it easy to miss some stencil apertures that needs modification for avoidance purposes, thereby resulting in a high error rate in the subsequent processes and wasting a lot of time. To sum up, the traditional manual avoidance method mainly has the following problems: 1) time-consuming (because it requires manually finding out stencil apertures that need modifications for avoidance purposes); 2) low coverage (because it cannot guarantee that the stencil apertures after modifications will satisfy the requirements of SMT processes); 3) easy to miss (because it cannot guarantee that all stencil apertures that need modifications for avoidance purposes will be found out by adopting the manual avoidance method. The above problems will affect the quality of stencil aperture designs, causing problems such as solder bridge, insufficient solder, exposed basis metal, non-wetting, and the like, which in turn affects the printing quality of PCBs.

Therefore, how to realize an effective stencil-avoidance method has become an urgent problem to be solved.

SUMMARY

In view of the above-mentioned shortcomings of the prior art, the present disclosure provides a stencil-avoidance design method, a stencil-avoidance design device, an electronic device and a non-transitory storage medium. The technical problems to be solved by the present disclosure is achieved through the following technical solutions:

The present disclosure provides the stencil-avoidance design method, including:

obtaining a plurality of first regions and a plurality of first stencil aperture regions;

determining whether a shortest distance between a selected first region of the plurality of first regions and a selected first stencil aperture region of the plurality of first stencil aperture regions is within a preset threshold range, and using the selected first region as a second region and using the selected first stencil aperture region as a second stencil aperture region if the shortest distance is within the preset threshold range;

obtaining a third region based on the second region;

determining whether the third region collides with the second stencil aperture region, and cropping the second stencil aperture region to obtain a third stencil aperture region if the third region collides with the second stencil aperture region; and obtaining a final stencil aperture region according to a first area ratio, a width-to-thickness ratio, a second area ratio, and a size ratio of the third stencil aperture region, and a relationship between an area of the third stencil aperture region and an area of the second stencil aperture region.

In an embodiment of the present disclosure, the step of obtaining the third region based on the second region includes:

obtaining the third region through expanding or contracting the second region along a preset direction; wherein the preset direction is a direction pointing from the second region to the second stencil aperture region.

In an embodiment of the present disclosure, the step of cropping the second stencil aperture region to obtain the third stencil aperture region includes:

cropping off a collision portion of the second stencil aperture region to obtain the third stencil aperture region so that the third stencil aperture region does not collide with the third region.

In an embodiment of the present disclosure, the first area ratio is a ratio of the area of the third stencil aperture region to an area of aperture walls corresponding to the third stencil region, and the second area ratio is a ratio of the area of the third stencil aperture region to the area of the second stencil aperture region.

In an embodiment of the present disclosure, the step of obtaining a final stencil aperture region according to the first area ratio, the width-to-thickness ratio, the second area ratio, and the size ratio of the third stencil aperture region, and the relationship between the area of the third stencil aperture region and the area of the second stencil aperture region includes:

step 1.51, determining whether the first area ratio, the width-to-thickness ratio, the second area ratio, the size ratio of the third stencil aperture region, and the ratio of the area of the third stencil aperture region to the area of the second stencil aperture region satisfies a first condition, a second condition, and a third condition; wherein the first condition is that the first area ratio is greater than a first threshold and the width-to-thickness ratio is greater than a second threshold, the second condition is that the relationship between the area of the third stencil aperture region and the area of the second stencil aperture region is less than a third threshold, and the third condition is that the second area ratio is greater than a fourth threshold and the size ratio is greater than a fifth threshold;

step 1.52, processing a corresponding third stencil aperture region in a preset manner to obtain a graphically processed third stencil aperture region, if all of the first condition, the second condition, and the third condition are not satisfied;

step 1.53, performing step 1.51 and step 1.52 on the graphically processed third stencil aperture region, after which graphical processing is performed for N times on the third stencil aperture region and/or the graphically processed third stencil aperture region, wherein the final stencil aperture region is obtained according to the third stencil aperture region graphical if N is not greater than a preset threshold and the third stencil aperture region after N times of graphical processing satisfies the first condition, the second condition, and the third condition; wherein a fourth stencil aperture region is obtained if N is equal to the preset threshold and the third stencil aperture regions after N times of graphical processing does not satisfy all of the first condition, the second condition, and the third condition; wherein N is a positive integer; and step 1.54, modifying the fourth stencil aperture region to obtain the final stencil aperture region.

In an embodiment of the present disclosure, the preset manner comprises at least one of a size adjustment manner, a position adjustment manner, and a shape adjustment manner.

In an embodiment of the present disclosure, the step of processing the third stencil aperture region in the preset manner to obtain the graphically processed third stencil aperture region includes:

processing the third stencil aperture region in the preset manner to obtain the graphically processed third stencil aperture region according to a preset order, where the size adjustment manner has a higher priority than the position adjustment manner, and the position adjustment manner has a higher priority than the shape adjustment manner.

In an embodiment of the present disclosure, one of the first regions comprises at least one of a through-hole region, a solder resist region, a profile region, and a device body region.

The present disclosure also provides the stencil-avoidance design device, including:

an acquisition module, used to obtain a plurality of first regions and a plurality of first stencil aperture regions;

a first analysis module, used to determine whether a shortest distance between a selected first region of the plurality of first regions and a selected first stencil aperture region f the plurality of first stencil aperture regions is within a preset threshold range, and use the selected first region as a second region and use the selected first stencil aperture region as a second stencil aperture region if the shortest distance is within the preset threshold range;

a region processing module, used to obtain a third region based on the second region; wherein a collision test is performed on the third region and the second stencil aperture region;

a second analysis module, used to determine whether the third region collides with the second stencil aperture region, and cropping the second stencil aperture region to obtain a third stencil aperture region if the third region collides with the second stencil aperture region; and a detection module, used to obtain a final stencil aperture region according to a first area ratio, a width-to-thickness ratio, a second area ratio, and a size ratio of the third stencil aperture region, and a relationship between an area of the third stencil aperture region and an area of the second stencil aperture region.

The present disclosure also provides the electronic device, including: a processor, a communication interface, a memory and a communication bus, wherein the processor, the communication interface, and the memory are communicated with each other through the communication bus;

a memory, used to store a computer program; and a processor, used to implement the method described above when executing the computer program.

The present disclosure also provides the non-transitory storage medium, the non-transitory storage medium stores a computer program, and the computer program implements the method described above when executed by the processor.

In an embodiment of the present disclosure,

The beneficial effects of the present disclosure are as follows:

The present disclosure determines the shortest distance between a selected element of multiple elements on the PCB and a selected stencil aperture of multiple stencil apertures, so as to obtain stencil apertures that need to be modified so that they do not collide with other elements. Collision tests are performed on the stencil apertures to be modified, before obtaining cropped stencil apertures. Finally, based on the first area ratio, the width-thickness ratio, the second area ratio, and the size ratio of the cropped stencil aperture and the relationship between the area of the third stencil aperture region and the area of the second stencil aperture region, it is determined whether the cropped stencil apertures need to be graphically processed, and then it is further determined whether the graphically processed stencil apertures meet the requirements according to the method of the present disclosure, until final stencil apertures are obtained. This method improves the efficiency, accuracy, coverage, and comprehensiveness of stencil aperture avoidance designs. It reduces manual intervention and avoid the problem of collision between elements due to human errors or omission of stencil apertures to be modified, as well as the problem of repeated modifications due to modified stencil apertures still not meeting process requirements. Compared with the traditional manual method, the method of the present disclosure has considerable advantages in terms of personnel requirements and operation methods, and replaces manual labor with automation, which is a trend in various industries. The present disclosure greatly reduces the design time of stencil apertures and improves the quality of stencil designs, which in turn improves the printing quality of PCBs.

The present disclosure will be further described in detail below in conjunction with the accompanying drawings and embodiments.

BRIEF DESCRIPTION OF THE DRAWINGS

FIG. 1 is a flowchart of a stencil-avoidance design method according to an embodiment of the present disclosure.

DETAILED DESCRIPTION

The present disclosure is described in further detail below in conjunction with specific embodiments, but the embodiments of the present disclosure are not limited thereto.

Embodiment 1

Figure 2:
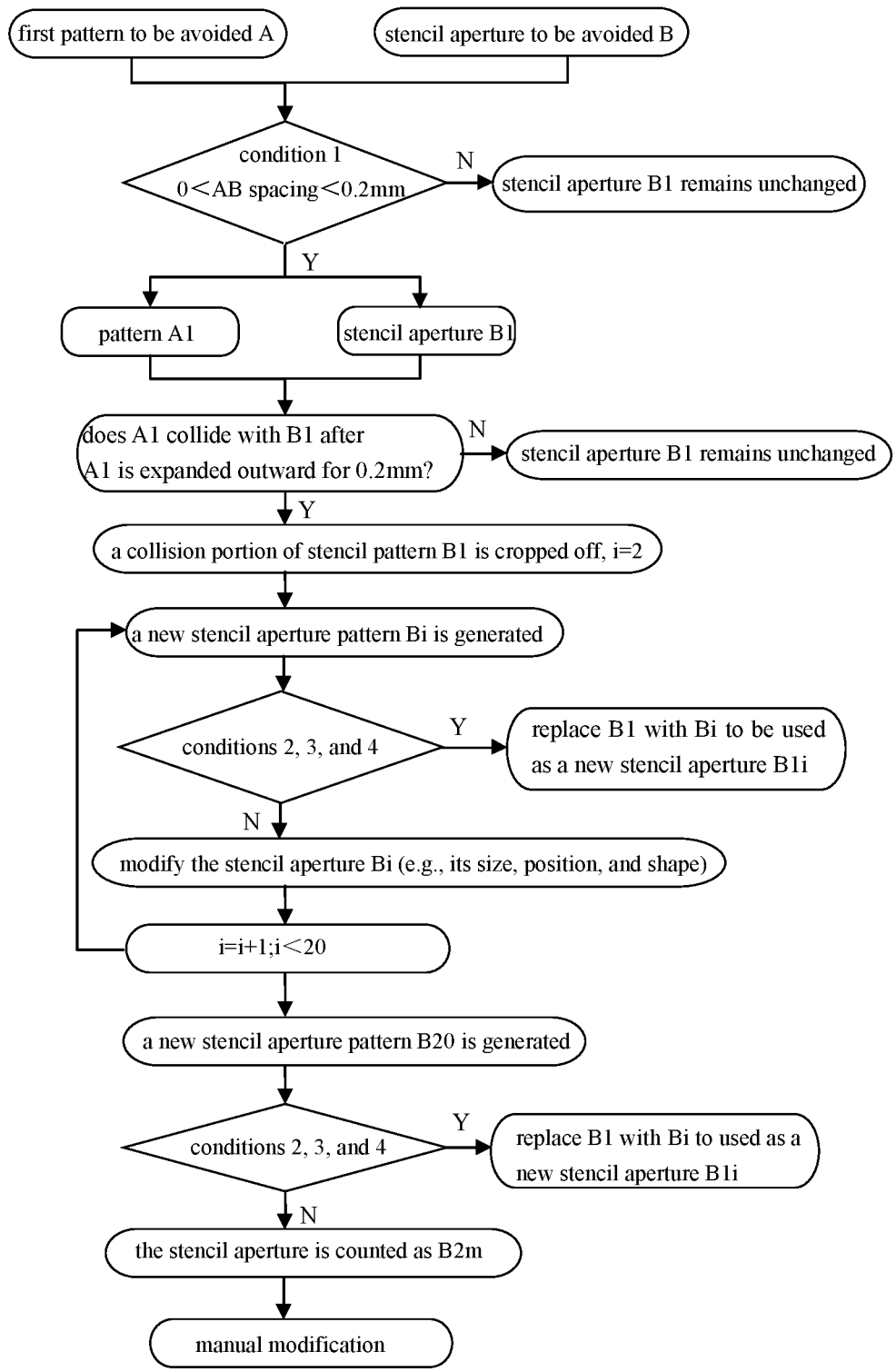
FIG. 2 is a flowchart of a stencil-avoidance design method according to another embodiment of the present disclosure.

Referring to FIG. 1 and FIG. 2, a stencil-avoidance design method is provided in Embodiment 1, and the method includes the following steps:

Step 1.1, obtaining a plurality of first regions and a plurality of first stencil aperture regions.

Step 1.2, determining whether a shortest distance between a selected first region of the plurality of first regions and a selected first stencil aperture region of the plurality of first stencil aperture regions is within a preset threshold range, and using the selected first region as a second region and using the selected first stencil aperture region as a second stencil aperture region if the shortest distance is within the preset threshold range.

Step 1.3, obtaining a third region based on the second region.

Step 1.4, determining whether the third region collides with the second stencil aperture region, and cropping the second stencil aperture region to obtain a third stencil aperture region if the third region collides with the second stencil aperture region.

Step 1.5, obtaining a final stencil aperture region according to a first area ratio, a width-to-thickness ratio, a second area ratio, and a size ratio of the third stencil aperture region, and a relationship between an area of the third stencil aperture region and an area of the second stencil aperture region.

In this embodiment, the first regions and the first stencil aperture regions are first obtained. The first regions are regions that may collide with some stencil apertures on a PCB, and the first stencil aperture regions are stencil aperture regions on a stencil. It is determined whether the shortest distance (i.e., a preset distance) between a selected first region of the plurality of first regions and a selected first stencil aperture region of the plurality of first stencil aperture regions is within the preset threshold range. The preset threshold range is a range in which the selected first stencil aperture region will need to be modified to better avoid the selected first region. If the shortest distance is not within the preset threshold range, the selected first stencil aperture region does not need to be modified, and the selected first stencil aperture region can be directly used as a final stencil aperture region. If the shortest distance is within the preset threshold range, the selected first stencil aperture region needs to be modified to better avoid the selected first region, and the selected first region is used as the second region and the selected first stencil aperture region is used as the second stencil aperture region. The preset threshold range is for example, 0 to 0.2 mm; i.e., if the shortest distance is greater than 0 and less than 0.2 mm, the shortest distance is within the preset threshold range. After the second region is determined, it is necessary to process the second region to obtain the third region, and then a collision test is performed on the third region and the second stencil aperture region. If the third region "collides" with the second stencil aperture region, the second stencil aperture region is cropped to obtain the third stencil aperture region. However, the third stencil aperture region does not necessarily meet the requirements of final stencil aperture regions. In order to further determine whether the third stencil opening region satisfies all the conditions, it is determined whether the third stencil aperture region needs to be adjusted to obtain a final stencil aperture region according to the first area ratio, the width-to-thickness ratio, the second area ratio, the size ratio of the third stencil aperture region, and the relationship between the area of the third stencil aperture region and the area of the second stencil aperture region. The first area ratio is a ratio of the area of the third stencil aperture region to an area of aperture walls corresponding to the third stencil region, and the second area ratio is a ratio of the area of the third stencil aperture region to the area of the second stencil aperture region. The area of the third stencil aperture region is an area of the stencil aperture of the third stencil aperture region, the area of the aperture walls is the sum of areas of the aperture walls corresponding to the third stencil aperture region. The third stencil aperture region is the cropped second stencil aperture region. The smallest rectangle that can contain the third stencil aperture region is a first rectangle; the smallest rectangle that can contain the second stencil aperture region is a second rectangle; the width-to-thickness ratio is a ratio of the width of the first rectangle to the thickness of the third stencil aperture region; the size ratio is a ratio of the length of the first rectangle to the length of the second rectangle, or a ratio of the width of the first rectangle to the width of the second rectangle; the widths of the first, second rectangles are smaller than the lengths of the first, second rectangles.

The first area ratio is the ratio of the area of the third stencil aperture region to the area of the aperture walls corresponding to the third stencil aperture region, wherein the aperture walls refers to walls of holes dug by the stencil.

The width-to-thickness ratio is given by W1/D1, wherein W1 is the width of the first rectangle and D1 is the thickness of the third stencil aperture region.

The second area ratio is the ratio of the area of the third stencil aperture region to the area of the second stencil aperture region, and the third stencil aperture region is the cropped second stencil aperture region.

The size ratio is given by W1/W2, or L1/L2, wherein W1 is the width of the first rectangle, L1 is the length of the first rectangle, W2 is the width of the second rectangle, and L2 is the length of the second rectangle.

In one embodiment, one of the first regions includes at least one of a through-hole region, a solder resist region, a profile region, and a device body region.

PCB design data is read and then preprocessed to obtain region data of the PCB, including data of through-holes, data of solder resist regions, data of profiles (i.e., outer frames of the PCB), data of device bodies, data of device coordinates and data of device package, etc. Data of solder paste layers is first generated based on the data of device package, the stencil aperture regions are created (or designed) for different types of devices based on the data of solder paste layers, and these stencil aperture regions are the first stencil aperture regions in one example. That is, the data of the stencil aperture regions used for avoidance analysis is hereby obtained. Alternatively, the Gerber file (whose filename extension is *.gbr) of the data of the stencil apertures is selected, and the stencil aperture layer is extracted by importing the Gerber file to obtain the first stencil aperture regions.

Figure 3A:
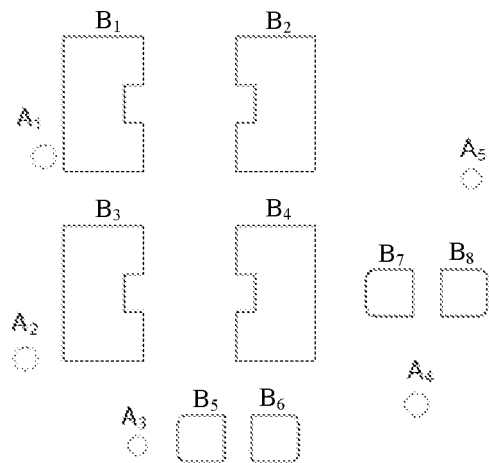
FIGS. 3a-3h are schematic diagrams of a process of a stencil-avoidance design method involving through-holes according to an embodiment of the present disclosure.
Figure 3B:
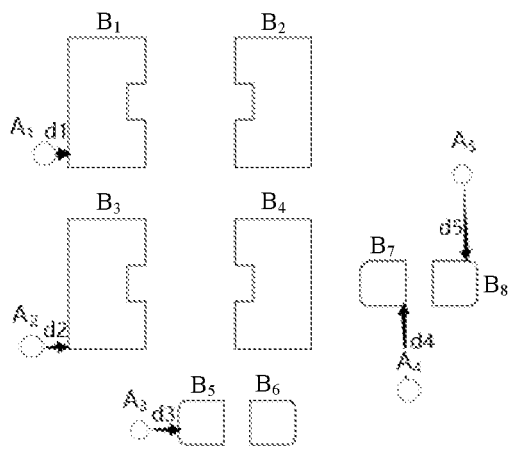
Figure 3C:
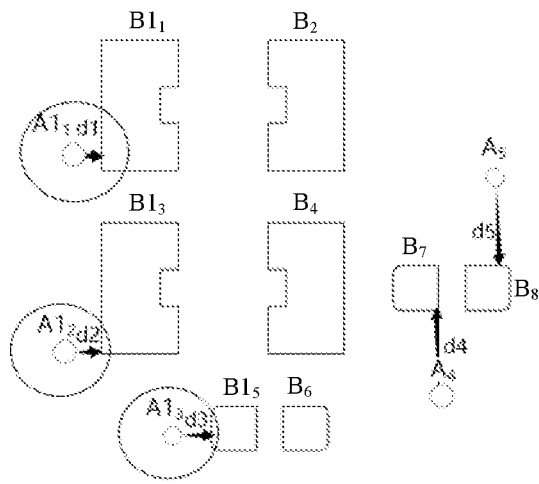

To more clearly illustrate step 1.2 of this embodiment, taking the first regions being through-holes as an example. Please refer to FIG. 3a. For example, the through-holes include through-holes $A_1$, $A_2$, $A_3$, $A_4$, and $A_5$, and the first stencil aperture regions include first stencil aperture regions $B_1$, $B_2$, $B_3$, $B_4$, $B_5$, $B_6$, $B_7$, and $B_8$; the distances between a selected through-hole ($A_1$, $A_2$, $A_3$, $A_4$, or $A_5$) and eight first stencil aperture regions ($B_1$, $B_2$, $B_3$, $B_4$, $B_5$, $B_6$, $B_7$, and $B_8$) are measured respectively, and the shortest distance between the selected through-hole ($A_1$, $A_2$, $A_3$, $A_4$, or $A_5$) and eight first stencil aperture regions is determined from the distances. As shown in FIG. 3b, d1 represents a measured distance between the through-hole $A_1$ and the first stencil aperture $B_1$ and is shorter than the distances between the through-hole $A_1$ and other first stencil apertures ($B_2$, $B_3$, $B_4$, $B_5$, $B_6$, $B_7$, and $B_8$), d1=0.07 mm, i.e., d1 is the shortest distance between the through-hole $A_1$ and the eight first stencil aperture regions ($B_1$, $B_2$, $B_3$, $B_4$, $B_5$, $B_6$, $B_7$, and $B_8$); d2 represents a measured distance between the through-hole $A_2$ and the first stencil aperture $B_3$ and is shorter than the distances between the through-hole $A_2$ and other first stencil apertures ($B_1$, $B_2$, $B_4$, $B_5$, $B_6$, $B_7$, and $B_8$) d2=0.12 mm, i.e., d2 is the shortest distance between the through-hole $A_2$ and the eight first stencil aperture regions ($B_1$, $B_2$, $B_3$, $B_4$, $B_5$, $B_6$, $B_7$, and $B_8$); d3 represents a measured distance between the through-hole $A_3$ and the first stencil aperture $B_5$ and is shorter than the distances between the through-hole $A_3$ and other first stencil apertures ($B_1$, $B_2$, $B_3$, $B_4$, $B_6$, $B_7$, and $B_8$), d3=0.18 mm, i.e., d3 is the shortest distance between the through-hole $A_3$ and the eight first stencil aperture regions ($B_1$, $B_2$, $B_3$, $B_4$, $B_5$, $B_6$, $B_7$, and $B_8$); d4 represents a measured distance between the through-hole $A_4$ and the first stencil aperture $B_7$ and is shorter than the distances between the through-hole $A_4$ and other first stencil apertures ($B_1$, $B_3$, $B_4$, $B_5$, $B_6$, $B_7$, and $B_8$), d4=0.3 mm, i.e., d4 is the shortest distance between the through-hole $A_4$ and the eight first stencil aperture regions ($B_1$, $B_2$, $B_3$, $B_4$, $B_5$, $B_6$, $B_7$, and $B_8$); d5 represents the measured distance between the through-hole A5 and the first stencil aperture $B_8$ and is shorter than the distances between the through-hole $A_5$ and other first stencil apertures ($B_1$, $B_2$, $B_3$, $B_4$, $B_5$, $B_6$, and $B_7$), d5=0.33 mm, i.e., d5 is the shortest distance between the through-hole $A_5$ and the eight first stencil aperture regions ($B_1$, $B_2$, $B_3$, $B_4$, $B_5$, $B_6$, $B_7$, and $B_8$). The distance between a selected through-hole and the first stencil aperture region closest to the selected through-hole is noted as an AB spacing (d1, d2, d3, d4, d5, for example), if the AB spacing is greater than 0 and less than 0.2 mm, the distance between the selected through-hole and the corresponding first stencil aperture region is within the preset threshold range. For example, because d1, d2, and d3 are all within the preset threshold range, the through-hole $A_1$ and the first stencil aperture region $B_1$, the through-hole $A_2$ and the first stencil aperture region $B_3$, and the through-hole $A_3$ and the first stencil aperture region $B_5$ are regions that satisfy the preset threshold range. As shown in FIG. 3c, the through-hole $A_1$, the through-hole $A_2$, the through-hole $A_3$, the first stencil aperture region $B_1$, the first stencil aperture region $B_3$ and the first stencil aperture region $B_5$ are then recorded as through-hole $A1_1$, through-hole $A1_2$, through-hole $A1_3$ and first stencil aperture region $B1_1$, first stencil aperture region $B1_3$ and first stencil aperture region $B1_5$, respectively.

In an embodiment, step 1.3 may include: obtaining the third region through expanding or contracting the second region along a preset direction, wherein the preset direction is a direction pointing from the second region to the second stencil aperture region.

In an embodiment, after the second region is determined, the second region is expanded or contracted along a direction pointing from the second region to the second stencil aperture region, and the expanded or contracted second region is used as the third region. For example, when the second region is a through-hole region, a solder resist region, or a device body region, the second region is expanded, and when the second region is a profile region, the second region is contracted. In the embodiment shown in FIG. 3, the through-hole $A1_1$, the through-hole $A1_2$, and the through-hole $A1_3$ need to be expanded, for example, a specified distance is added to the original radius of each through-hole to obtain an expanded through-hole $A1_1$, an expanded through-hole $A1_2$, and an expanded through-hole $A1_3$, for example, if the specified distance is 0.2 mm and the original radius of a through-hole is 0.1 mm, the radius of the corresponding expanded through-hole is 0.3 mm.

In an embodiment, the specified distance is any value within the preset threshold range.

In an embodiment, step 1.4 includes: determining whether the third region collides with the second stencil aperture region, and cropping the second stencil aperture region to obtain a third stencil aperture region if the third region collides with the second stencil aperture region.

Figure 3D:
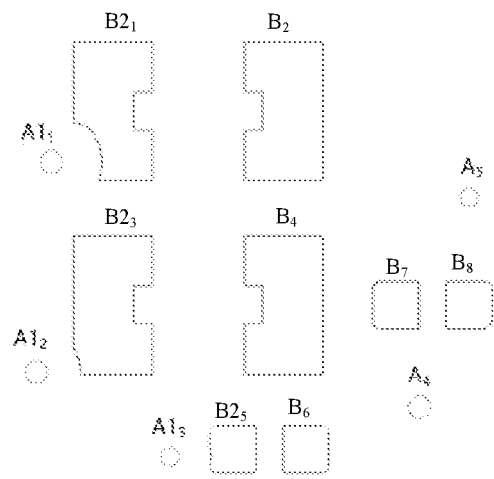

In an embodiment, the third region and the second stencil aperture region are subjected to a collision test. If the third region collides with the second stencil aperture region, the portion of the second stencil aperture region that overlaps with the third region is defined as a collision portion, which is then cropped off and the cropped second stencil aperture region is used as the third stencil aperture region so that the third stencil aperture region does not collide with the third region. For example, in FIG. 3d, the first stencil aperture region $B2_1$ is a region obtained from cropping the first stencil aperture region $B1_1$, the first stencil aperture region $B2_3$ is a region obtained from cropping the first stencil aperture region $B1_3$, and the first stencil aperture region $B2_5$ is a region obtained from cropping the first stencil aperture region $B1_5$. The respective notched portion of the first stencil aperture regions $B2_1$, $B2_3$, and $B2_5$ in FIG. 3d is where cropping takes place.

In an embodiment, step 1.5 includes the following steps:

step 1.51, determining whether the first area ratio, the width-to-thickness ratio, the second area ratio, the size ratio of the third stencil aperture region, and the relationship between the area of the third stencil aperture region and the area of the second stencil aperture region satisfies a first condition, a second condition, and a third condition; wherein the first condition is that the first area ratio is greater than a first threshold and the width-to-thickness ratio is greater than a second threshold, the second condition is that the relationship between the area of the third stencil aperture region and the area of the second stencil aperture region is less than a third threshold, and the third condition is that the second area ratio is greater than a fourth threshold and the size ratio is greater than a fifth threshold.

Step 1.52, processing a corresponding third stencil aperture region in a preset manner to obtain a graphically processed third stencil aperture region, if all of the first condition, the second condition, and the third condition are not satisfied.

In this embodiment, when a selected third stencil aperture region satisfies the first condition, the second condition, and the third condition, it means that the distances between the selected third stencil aperture region and the regions on the PCB all satisfy the distance requirement and modification for avoidance purposes is not required, and then the selected third stencil aperture region replaces the initially designed first stencil aperture region and is used as a final stencil aperture region. If any one of the first condition, the second condition, and the third condition is not satisfied, it means that a distance between the selected third stencil aperture region and one region on the PCB does not satisfy the distance requirement and modification for avoidance purposes is required, and then the selected third stencil aperture region may be adjusted in the preset manner, such as adjusting the size, shape or position of the selected third stencil aperture region. In an embodiment, the first threshold is 0.66, the second threshold is 1.5, the third threshold is 20%, the fourth threshold is 50%, and a fifth threshold is 50%. For example, for the first stencil aperture regions $B2_1$, $B2_3$, and $B2_5$, the first area ratio is greater than 0.66, the width-to-thickness ratio is greater than 1.5, the second area ratio is greater than 50%, the size ratio is greater than 50%, and the ratio of the area of the third stencil aperture region to the area of the second stencil aperture region is less than 20%.

In an embodiment, the preset manner includes at least one of a size adjustment manner, a position adjustment manner, and a shape adjustment manner. If the third stencil aperture region does not satisfy the first condition, the second condition, and the third condition, the third stencil aperture region can be adjusted by the size adjustment manner and/or the position adjustment manner and/or the shape adjustment manner. The size adjustment manner can be performed by reducing the size of the third stencil aperture region, for example, reducing the overall size of the third stencil aperture region by 20 times (i.e., the shrunk third stencil aperture region is 0.05 times as large as the original one), the position adjustment manner can be performed by moving the third stencil aperture region away from the regions to be avoided, and the shape adjustment manner can be performed by adjusting the width or length of the third stencil aperture region.

In an embodiment, the step of processing the third stencil aperture region in the preset manner to obtain a graphically processed third stencil aperture region includes: processing the third stencil aperture region in the preset manner to obtain the graphically processed third stencil aperture region according to a preset order, where the size adjustment manner has a higher priority than the position adjustment manner, and the position adjustment manner has a higher priority than the shape adjustment manner.

In some embodiments, the third stencil aperture region is adjusted only by the size adjustment manner, or only by the position adjustment manner, or only by the shape adjustment manner, or by two adjustment manners or three adjustment manners as described above. In order to improve processing efficiency, the adjustment manners can be selected in a preset order. For example, when only one adjustment manner is used, the size adjustment manner has a higher priority than the position adjustment manner, and the position adjustment manner has a higher priority than the shape adjustment manner. When two adjustment manners are used, the priority of a combination of the size adjustment manner and the position adjustment manner where the size adjustment manner is used before the position adjustment method is higher than that of a combination of the position adjustment manner and the shape adjustment manner where the position adjustment manner is used before the shape adjustment method. When three adjustment manners are used, the size adjustment manner is first used, then the position adjustment method is used, and the shape adjustment method is last used.

Figure 3E:
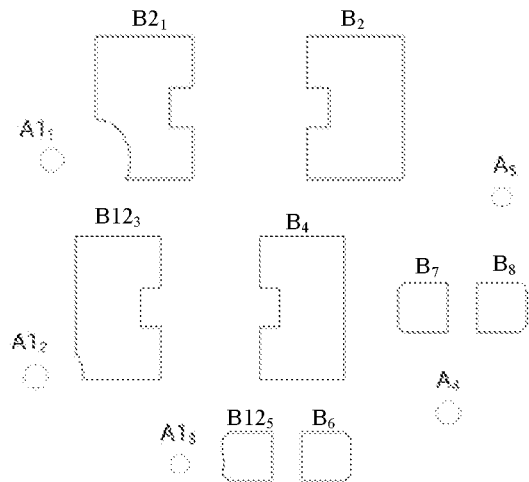
Figure 3F:
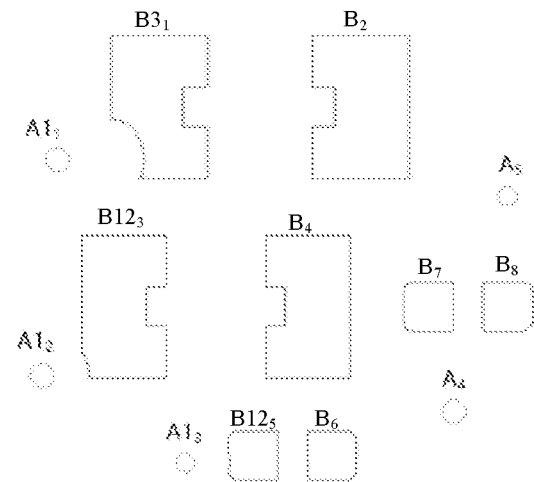
Figure 3G:
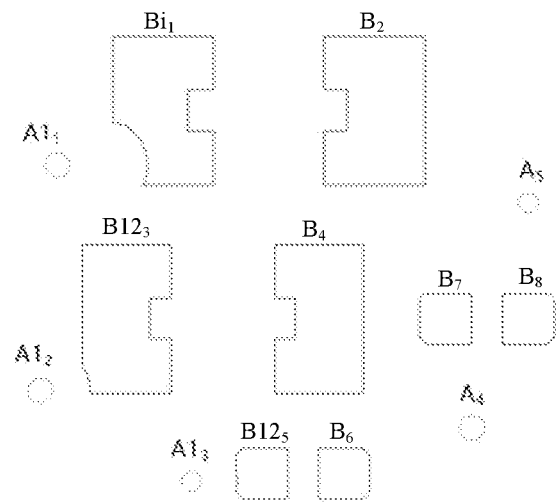

For example, if the third stencil aperture regions $B2_3$, $B2_5$ in FIG. 3d satisfy the first condition, the second condition, and the third condition, the third stencil aperture region $B2_3$ replaces the first stencil aperture region $B_3$ and the third stencil aperture region $B2_5$ replaces the first stencil aperture region $B_5$, so that the third stencil aperture regions $B2_3$, $B2_5$ are used as new stencil aperture regions, such as, $B12_3$, $B12_5$ in FIG. 3e.

If the distance between the third stencil aperture region $B2_1$ and the through-hole $A1_1$ as shown in FIG. 3d is so short that there is a large notch on the third stencil aperture region $B2_1$, which in turn makes the width-to-thickness ratio of the third stencil aperture region $B2_1$ fail to satisfy the first condition, then the third stencil aperture region $B2_1$ needs to be modified. For example, the third stencil aperture region $B2_1$ is first modified (e.g., reduced by 5%), then the position of the third stencil aperture region $B2_1$ is modified (e.g., the third stencil aperture region $B2_1$ moves for a specified distance in a direction pointing from the through-hole $A1_1$ to the third stencil aperture region $B2_1$, and the specified distance is, for example, 0.001 mm), and then the shape of the third stencil aperture $B2_1$ is modified (e.g., the length and/or width of the third stencil aperture $B2_1$ is adjusted minutely, for example, a ratio of the adjustment(to the original dimension (length or width) is within a threshold range, e.g., 0.5%-10%) to generate a new stencil aperture region $B3_1$ shown in FIG. 3f. The stencil aperture region $B3_1$ is obtained by moving the third stencil aperture region $B2_1$ for the specified distance in the direction pointing from the through-hole $A1_1$ to the third stencil aperture region $B2_1$, and increasing the width of the third stencil aperture region $B2_1$ so that the ratio of the increase to the original width meets the threshold range (e.g., 0.5%-10%).

Step 1.53, performing step 1.51 and step 1.52 on the graphically processed third stencil aperture region, after which graphical processing is performed for N times on the third stencil aperture region and/or the graphically processed third stencil aperture region, wherein a final stencil aperture region is obtained based on the third stencil aperture region graphical if N is not greater than a preset threshold and the third stencil aperture region after N times of graphical processing satisfies the first condition, the second condition, and the third condition; wherein a fourth stencil aperture region is obtained if the N is equal to the preset threshold and the third stencil aperture regions after N times of graphical processing does not satisfy all of the first condition, the second condition, and the third condition, wherein N is a positive integer.

Figure 3H:
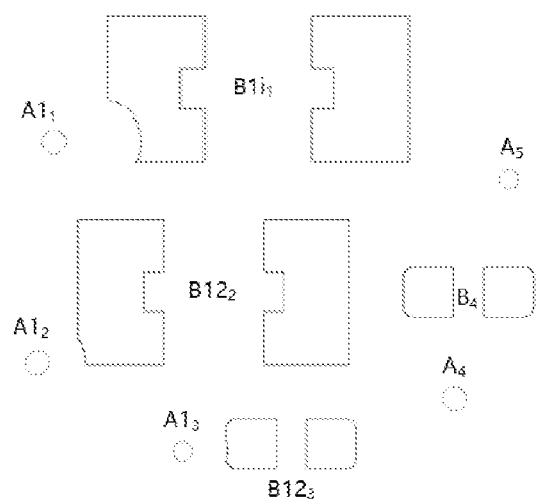

In an embodiment, steps 1.51 to 1.52 are performed on the graphically processed third stencil aperture region, after which graphical processing is performed for N times on the third stencil aperture region and/or the graphically processed third stencil aperture region. If N is less than or equal to the preset threshold and the third stencil aperture region after N times of graphical processing satisfies the first condition, the second condition, and the third condition, the third stencil aperture region after N times of graphical processing replaces the original stencil aperture region to be used as the final stencil aperture region. If N is equal to the preset threshold and the third stencil aperture region after N times of graphical processing does not satisfy the first condition, the second condition, and the third condition at the same time, it means that the third stencil aperture region after N times of graphical processing still does not meet the requirements after the above adjustment manners, and the third stencil aperture region after N times of graphical processing is used as the fourth stencil aperture region. For example, in FIG. 3g, the stencil aperture region Bi1 is the stencil aperture region after i times of graphical processing. The preset threshold is, for example, 20. The final stencil aperture region obtained after i times of graphical processing (e.g., $B_1i1$) is represented in FIG. 3h.

Step 1.54, modifying the fourth stencil aperture region to obtain the final stencil aperture region.

In an embodiment, the fourth stencil aperture regions that do not meet the requirements are counted one by one, returned to the window for the avoidance analysis in the form of a report, and their corresponding coordinate positions are displayed for manual reviewing and modification, and the fourth stencil aperture regions that do not meet the requirements are manually modified to obtain the final stencil aperture regions that meet the design requirements.

It should be understood that this embodiment modifies the first regions to be the third region only for determining whether the stencil aperture region needs to be modified, and after the final stencil aperture region is determined using the method of the present disclosure, the through-holes, solder resist regions, profile regions, and device bodies should stay unchanged.

The present disclosure determines the shortest distance between a selected element of multiple elements on the PCB and a selected stencil aperture of multiple stencil apertures, so as to obtain stencil apertures that need to be modified so that they do not collide with other elements. Collision tests are performed on the stencil apertures to be modified, before obtaining cropped stencil apertures. Finally, based on the first area ratio, the width-thickness ratio, the second area ratio, the size ratio of the cropped stencil aperture and the relationship between the area of the third stencil aperture region and the area of the second stencil aperture region, it is determined whether the cropped stencil apertures need to be graphically processed, and then it is further determined whether the graphically processed stencil apertures meet the requirements according to the method of the present disclosure, until final stencil apertures are obtained. This method improves the efficiency, accuracy, coverage, and comprehensiveness of stencil aperture avoidance designs. It reduces manual intervention and avoid the problem of collision between elements due to human errors or omission of stencil apertures to be modified, as well as the problem of repeated modifications due to modified stencil apertures still not meeting process requirements. Compared with the traditional manual method, the method of the present disclosure has considerable advantages in terms of personnel requirements and operation methods, and replaces manual labor with automation, which is a trend in various industries. The present disclosure greatly reduces the design time of stencil apertures and improves the quality of stencil designs, which in turn improves the printing quality of PCBs.

Embodiment 2

Figure 4A:
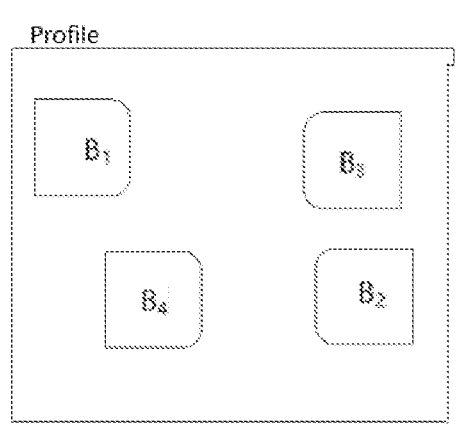
FIGS. 4a-4h are schematic diagrams of a process of a stencil-avoidance design method involving profiles according to an embodiment of the present disclosure.

Please refer to FIGS. 4a-4h. FIGS. 4a-4h are schematic diagrams of a process of a stencil-avoidance design method involving profiles according to an embodiment of the present disclosure. On the basis of the above-mentioned embodiments, this embodiment takes the first regions being the profile of the PCB as an example to illustrate the process. The process includes the following steps:

Step 2.1, PCB design data is read and then preprocessed to obtain region data of the PCB, such as, data of through-holes, data of solder resist regions, data of profiles (i.e., outer frames of the PCB), data of device bodies, data of device coordinates and data of device package, etc. The data of solder paste layers is first generated based on the data of device package, and then stencil aperture regions are created (or designed) for different types of devices based on the data of solder paste layers, and the data of the stencil aperture regions used for avoidance analysis is obtained. As shown in FIG. 4a, there are four edges (including an upper edge, a lower edge, a left edge, and a right edge) of the profile of the PCB and four first stencil aperture regions (including a first stencil aperture region $B_1$, a first stencil aperture region $B_2$, a first stencil aperture region $B_3$, and a first stencil aperture region $B_4$) that need avoidance analysis.

Figure 4B:
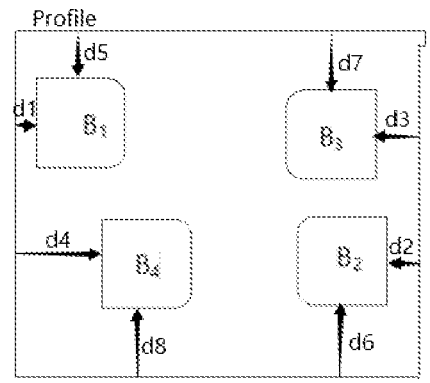

Step 2.2, as shown in FIG. 4b, for each edge of the frame: the distances between the edge and edges of each of the first stencil aperture regions ($B_1$, $B_2$, $B_3$, and $B_4$) are measured, from which a shortest distance is selected and denoted as an AB spacing, and it is determined if the shortest distance (i.e., AB spacing) is within the preset threshold range, where the preset threshold range is 0 to 0.2 mm. Taking the upper edge of the profile as an example: distances between edges of the first stencil aperture region $B_1$ and the upper edge of the profile are measured, and the shortest one among them are selected to be the shortest distance between the first stencil aperture region $B_1$ and the upper edge of the profile; distances between edges of the first stencil aperture region $B_2$ and the upper edge of the profile are measured, and the shortest one among them are selected to be the shortest distance between the first stencil aperture region $B_2$ and the upper edge of the profile; distances between edges of the first stencil aperture region $B_3$ and the upper edge of the profile are measured, and the shortest one among them are selected to be the shortest distance between the first stencil aperture region $B_3$ and the upper edge of the profile; distances between edges of the first stencil aperture region $B_4$ and the upper edge of the profile are measured, and the shortest one among them are selected to be the shortest distance between the first stencil aperture region $B_4$ and the upper edge of the profile; it is then determined whether each of the shortest distances is within the preset threshold range. The process of determining the shortest distances between another edge of the profile and the first stencil aperture regions $B_1$, $B_2$, $B_3$ and $B_4$ is similar to that of the upper edge.

Figure 4C:
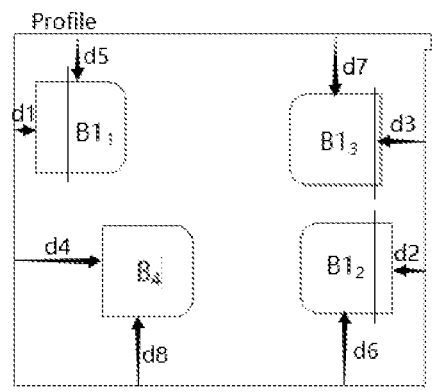

Step 2.3, If the shortest distance between any edge of the profile and a selected first stencil aperture region is within the preset threshold range (for example, 0 to 0.2 mm), the selected first stencil aperture region is used as a second stencil aperture region, and the corresponding edge of the profile remains unchanged. As shown in FIG. 4b, d1 represents a measured distance between the left edge of the profile and the left edge of the first stencil aperture region $B_1$, d1=0.07 mm; d2 represents a measured distance between the right edge of the profile and the right edge of the first stencil aperture region $B_2$, d2=0.13 mm; d3 represents a measured distance between the right edge of the profile and the right edge of the first stencil aperture region $B_3$, d3=0.18 mm; d4 represents a measured distance between the left edge of the profile and the left edge of the first stencil aperture region $B_4$, d4=0.4 mm; d5 represents a measured distance between the upper edge of the profile and the upper edge of the first stencil aperture region $B_1$, d5=0.21 mm; d6 represents a measured distance between the lower edge of the profile and the lower edge of the first stencil aperture region, d6=0.38 mm; d7 represents a measured distance between the upper edge of the profile and the upper edge of the first stencil aperture region $B_3$, d7=0.3 mm; d8 represents a measured distance between the lower edge of the profile and the lower edge of the first stencil aperture region $B_4$, d8=0.36 mm. Because the shortest distance (i.e., d1) between the left edge of the profile and the first stencil aperture region $B_1$, the shortest distance (i.e., d2) between the right edge of the profile and the first stencil aperture region $B_2$, and the shortest distance (i.e., d3) between the right edge and the first stencil aperture region $B_3$ are all within the preset threshold range, the first stencil aperture region $B_1$ is used as a second stencil aperture region $B1_1$, the first stencil aperture region $B_2$ is used as a second stencil aperture region $B1_2$, and the first stencil aperture region $B_3$ is used as a second stencil aperture region $B1_3$ as shown in FIG. 4c.

Step 2.4, if the distance between an edge of the profile and an edge of a selected first stencil aperture region is not within the preset threshold range, the edge of the selected first stencil aperture region remains unchanged. As shown in FIG. 4b, because the distance (i.e., d4) between the left edge of the profile and the left edge of the first stencil aperture region $B_4$, the distance (i.e., d8) between the lower edge of the profile and the lower edge of the first stencil aperture region $B_4$, the distance (i.e., d5) between the upper edge of the profile and the upper edge of the first stencil aperture region $B_1$, the distance (i.e., d6) between the lower edge of the profile and the lower edge of the first stencil aperture region $B_2$, and the distance (i.e., d7) between the upper edge of the profile and the upper edge of the first stencil aperture region $B_3$ are not within the preset threshold range, the left and lower edges of the first stencil aperture region $B_4$, the upper edge of the first stencil aperture region $B_1$, the lower edge of the first stencil aperture region $B_2$, and the upper edge of the first stencil aperture region $B_3$ remain unchanged.

Step 2.5, when the shortest distance between any edge of the profile and a selected first stencil aperture region is within the preset threshold range (at which time the selected first stencil aperture region is the second stencil aperture region), moving the edge of the profile towards the second stencil aperture region by, for example, 0.2 mm. The black vertical lines over the second stencil aperture region $B1_1$, $B1_2$ and $B1_3$ in FIG. 4c are edges of the profile after the moving. Collision tests are performed on the moved edges and the second stencil aperture $B1_1$, $B1_2$ and $B1_3$ respectively.

Figure 4D:
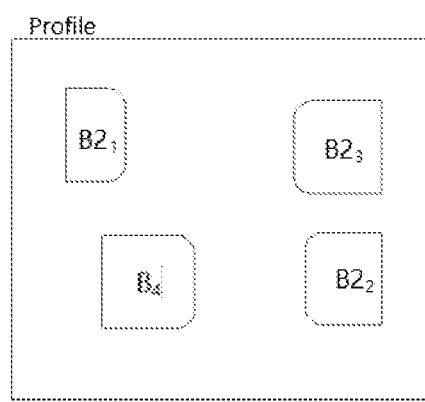

Step 2.6, if a collision occurs, a collision portion of the corresponding second stencil aperture region is cropped off to obtain a third stencil aperture region. Herein, the collision portion of Step 2.6 is the portion of the second stencil aperture region that the moved edges of the profile swept across. As shown in FIG. 4c and FIG. 4d, a collision portion of the second stencil aperture region $B1_1$ is cropped off to obtain a third stencil aperture region $B2_1$, a collision portion of the second stencil aperture region $B1_2$ is cropped off to obtain a third stencil aperture region $B2_2$, and a collision portion of the second stencil aperture region $B1_3$ is cropped off to obtain a third stencil aperture region $B2_3$.

Step 2.7, it is determined whether the first area ratio associated with the third stencil aperture region $B2_1$ is greater than 0.66, the width-to-thickness ratio associated with the third stencil aperture region $B2_1$ is greater than 1.5, the second area ratio associated with the third stencil aperture region $B2_1$ is greater than 50%, the size ratio associated with the third stencil aperture region $B2_1$ is greater than 50%, and the ratio of the area of the third stencil aperture region $B2_1$ to the area of the second stencil aperture region $B1_1$ is less than 20%. The judgment process of the third stencil aperture region $B2_2$ and the third stencil aperture region $B2_3$ is similar to that of the third stencil aperture region $B2_1$.

Figure 4E:
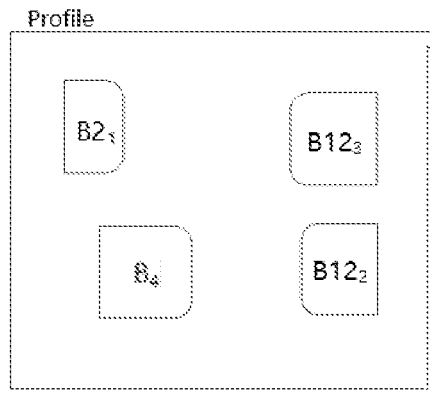

Step 2.8, if the conditions in step 2.7 are all satisfied by a third stencil aperture region, this third stencil aperture region is used to replace the corresponding first stencil aperture region that is unmodified. As shown in FIG. 4e, the third stencil aperture region $B2_2$ and the third stencil aperture region $B2_3$ satisfy the conditions in step 2.7, the third stencil aperture region $B2_2$ is used as a new stencil aperture region $B12_2$ to replace the first stencil aperture region $B_2$, and the third stencil aperture region $B2_3$ is used as a new stencil aperture region $B12_3$ to replace the first stencil aperture region $B_3$.

Figure 4F:
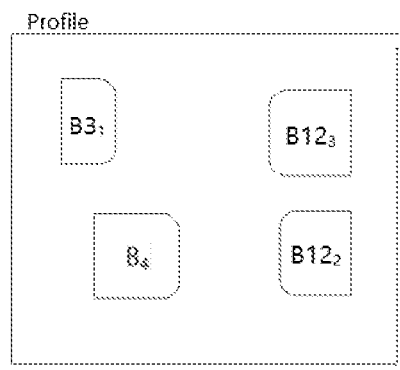

Step 2.9, for one of the third stencil aperture regions, if any of the conditions in step 2.7 is not satisfied, the third stencil aperture region needs to be graphically modified. The modification process of the third stencil aperture region is as follows: the size of the third stencil aperture region is first modified (e.g., reduced by 5%), and then the position of the third stencil aperture region is modified (e.g., the third stencil aperture region moves for a specified distance in a direction pointing from the left edge of the profile to the third stencil aperture region, e.g., the specified distance is 0.001 mm), and then the shape of the third stencil aperture is modified (e.g., the length and/or width of the third stencil aperture is adjusted minutely, for example, a ratio of the adjustment to the original length or width is within a threshold range (e.g., 0.5%-10%)) to generate a new stencil aperture region. In an embodiment, a shortest distance between the third stencil aperture region $B2_1$ and the left edge of the profile in FIG. 4e is so short that there is a large notch on the third stencil aperture region $B2_1$, which in turn makes the width-to-thickness ratio of the third stencil aperture region $B2_1$ fail to satisfy the first condition, then the third stencil aperture region $B2_1$ needs to be graphically modified. In FIG. 4f, the stencil aperture region $B3_1$ is obtained by moving the third stencil aperture region $B2_1$ by the specified distance in the direction pointing from the left edge of the profile to the third stencil aperture region $B2_1$, and increasing the width of the third stencil aperture region $B2_1$ to meet the threshold range (e.g., 0.5%-10%).

Figure 4G:
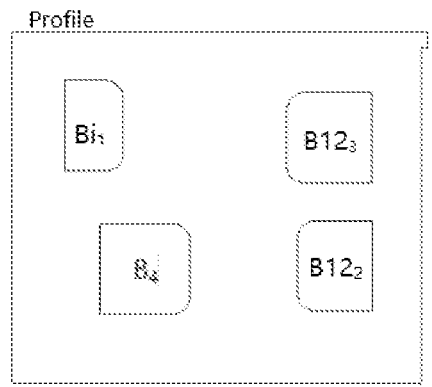

Step 2.10, step 2.7 is performed on the graphically processed stencil aperture region obtained in step 2.9. If the graphically processed third stencil aperture region obtained in step 2.9 does not satisfy the conditions in step 2.7, step 2.9 is performed again. Step 2.7, step 2.8, and step 2.9 are performed repeatedly until a new stencil aperture region Bi (the value of i starts from 2, and i<20) is generated. When i=20, steps 2.7 to 2.9 are no longer repeated and the loop ends. As shown in FIG. 4g, a new stencil aperture region $Bi_1$ is generated.

Figure 4H:
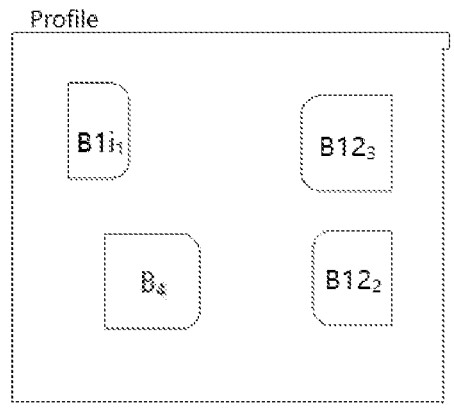

Step 2.11, if the conditions in step 2.7 are all satisfied, the first stencil aperture $B_1$ is replaced with the new stencil aperture region Bi. As shown in FIG. 4h, the first stencil aperture $B_1$ is replaced with the stencil aperture region $B1i_1$.

Step 2.12, record all the new stencil aperture regions Bi that do not satisfy the conditions in step 2.7 when i has reached 20, and return them to a window for avoidance analysis in the form of a report, and coordinate positions of the recorded new stencil aperture regions are displayed for manual reviewing and modification.

Embodiment 3

Figure 5A:
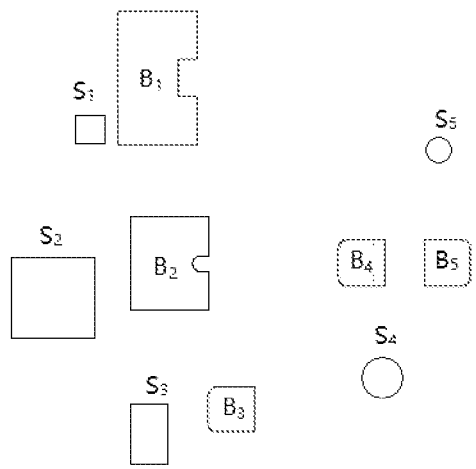
FIGS. 5a-5h are schematic diagrams of a process of a stencil-avoidance design method involving solder resist regions according to an embodiment of the present disclosure.

Referring to FIGS. 5a-5h. FIGS. 5a-5h are schematic diagrams of the stencil-avoidance design method involving solder resists according to an embodiment of the present disclosure. On the basis of the above-mentioned embodiments, this embodiment takes the first regions being the solder resists as an example to illustrate the process. The process includes the following steps:

Step 3.1, PCB design data is read and then preprocessed to obtain the region data of the PCB, such as, data of through-holes, data of solder resist regions, data of profiles (i.e., outer frames of the PCB), data of device bodies, data of device coordinates and data of device package, etc. The data of solder paste layers is first generated based on the data of device package, and then the stencil aperture regions are created (or designed) for different types of devices based on the data of solder paste layers. As shown in FIG. 5a, there are five solder resists (including a solder resist $S_1$, a solder resist $S_2$, a solder resist $S_3$, a solder resist $S_4$, and a solder resist $S_5$) and five first stencil aperture regions (including a first stencil aperture region $B_1$, a first stencil aperture region $B_2$, a first stencil aperture region $B_3$, a first stencil aperture region $B_4$, and a first stencil aperture region $B_5$) that need avoidance analysis.

Figure 5B:
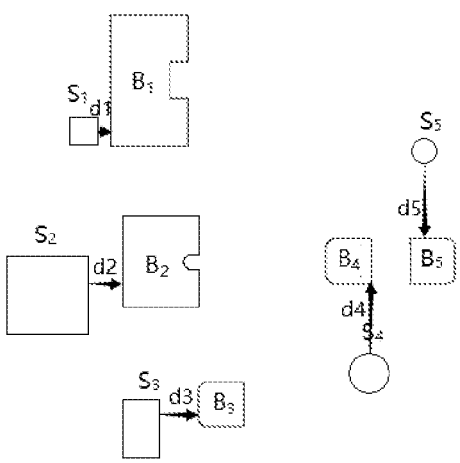

Step 3.2, as shown in FIG. 5b, the distances between a selected solder resist ($S_1$, $S_2$, $S_3$, $S_4$, or $S_5$) and five first stencil aperture regions ($B_1$, $B_2$, $B_3$, $B_4$, and $B_5$) are measured respectively, and the shortest distance between the selected solder resist ($S_1$, $S_2$, $S_3$, $S_4$, or $S_5$) and the five first stencil aperture regions is determined from the distances. The shortest distance between the selected solder resist and five first stencil aperture regions is noted as an AB spacing. It is determined whether the shortest distance between the selected solder resist and the five first stencil aperture regions is within the preset threshold range, i.e., whether the shortest distance (i.e., the AB spacing) is greater than 0 and less than 0.2 mm.

Step 3.3, if the shortest distance between the selected solder resist and any of the five first stencil aperture regions is within the preset threshold range (for example, 0 to 0.2 mm), the first stencil aperture region closest to the selected solder resist is used as a second stencil aperture region. As shown in FIG. 5b, d1 represents a measured distance between the solder resist $S_1$ and the first stencil aperture region $B_1$ and is shorter than the distances between the solder resist $S_1$ and other first stencil apertures ($B_2$, $B_3$, $B_4$, and $B_5$), d1=0.07 mm, i.e., d1 is the shortest distance between the solder resist $S_1$ and the five first stencil aperture regions ($B_1$, $B_2$, $B_3$, $B_4$, and $B_5$); d2 represents a measured distance between the solder resist $S_2$ and the first stencil aperture region $B_2$ and is shorter than the distances between the solder resist $S_2$ and other first stencil apertures ($B_1$, $B_3$, $B_4$, and $B_5$), d2=0.13 mm, i.e., d2 is the shortest distance between the solder resist $S_2$ and the five first stencil aperture regions ($B_1$, $B_2$, $B_3$, $B_4$, and $B_5$); d3 represents a measured distance between the solder resist $S_3$ and the first stencil aperture region $B_3$ and is shorter than the distances between the solder resist $S_3$ and other first stencil apertures ($B_1$, $B_2$, $B_4$, and $B_5$), d3=0.18 mm, i.e., d3 is the shortest distance between the solder resist $S_3$ and the five first stencil aperture regions ($B_1$, $B_2$, $B_3$, $B_4$, and $B_5$); d4 represents a measured distance between the solder resist $S_4$ and the first stencil aperture region $B_4$ and is shorter than the distances between the solder resist $S_4$ and other first stencil apertures ($B_1$, $B_2$, $B_3$, and $B_5$), d4=0.35 mm, i.e., d4 is the shortest distance between the solder resist $S_4$ and the five first stencil aperture regions ($B_1$, $B_2$, $B_3$, $B_4$, and $B_5$); d5 represents a measured distance between the solder resist $S_5$ and the first stencil aperture region $B_5$ and is shorter than the distances between the solder resist $S_5$ and other first stencil apertures ($B_1$, $B_2$, $B_3$, and $B_4$), d5=0.38 mm, i.e., d5 is the shortest distance between the solder resist $S_5$ and the five first stencil aperture regions ($B_1$, $B_2$, $B_3$, $B_4$, and $B_5$). Because d1, d2, and d3 are all within the preset threshold range, the first stencil aperture region $B_1$, the first stencil aperture region $B_2$, and the first stencil aperture region $B_3$ are directly used as a second stencil aperture region $B1_1$, a second stencil aperture region $B1_2$, and a second stencil aperture region $B1_3$ respectively in FIG. 5c.

Step 3.4, if the distance between the selected solder resist and a selected first stencil aperture region is not within the preset threshold range, the selected first stencil aperture region remains unchanged. For example, as shown in FIG. 5b, the distance between the solder resist $S_4$ and the first stencil aperture region $B_4$, and the distance between the solder resist $S_5$ and the first stencil aperture region $B_5$ are not within the preset threshold range, the first stencil aperture region $B_4$ and the first stencil aperture region $B_5$ remain unchanged.

Figure 5C:
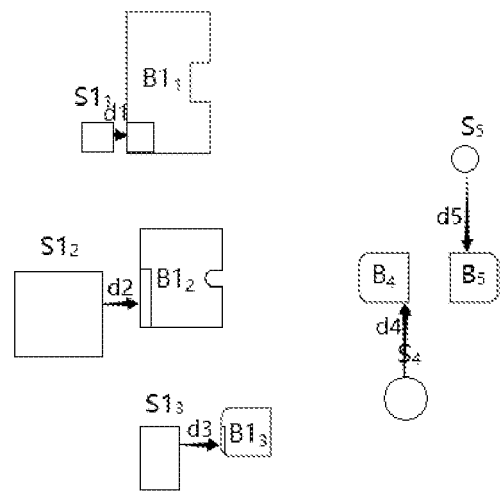

Step 3.5, if the shortest distance between the selected solder resist and a selected first stencil aperture region of the five first stencil aperture regions in step 3.2 is within the preset threshold range (at which time the selected first stencil aperture region is the second stencil aperture region), the selected solder resist is expanded to a specified distance (e.g., 0.2 mm) along a direction pointing from the selected solder resist to the second stencil aperture region. The external expansion refers that an edge of the selected solder resist facing the second stencil aperture region is expanded to the specified distance in the direction pointing from the selected solder resist to the second stencil aperture region. A collision test is performed on the selected solder resist after external expansion (i.e., the third region) and the second stencil aperture region. The portion of the second stencil aperture region that overlaps with the solder resist after external expansion (i.e., the third region) is defined as a collision portion. In FIG. 5c, a solder resist $S1_1$ is obtained by expanding the solder resist $S_1$, the solder resist $S1_2$ is obtained by expanding the solder resist $S_2$, and the solder resist $S1_3$ is obtained by expanding the solder resist $S_3$. FIG. 5c shows that a collision portion between the solder resist $S1_1$ and the second stencil aperture region $B1_1$, a collision portion between the solder resist $S1_2$ and the second stencil aperture region $B1_2$, and a collision portion between the solder resist $S1_3$ and the second stencil aperture region $B1_3$.

Figure 5D:
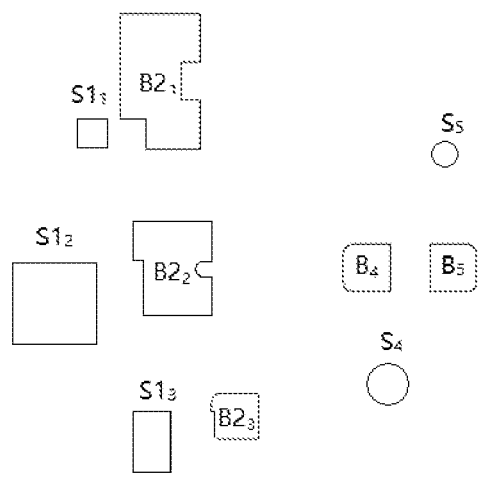

Step 3.6, if a collision occurs, a collision portion of the corresponding second stencil aperture region is cropped off to obtain a third stencil aperture region. Herein, the collision portion of Step 3.6 is the portion of the second stencil aperture region that overlaps with the solder resist after external expansion. As shown in FIG. 5c and FIG. 5d, a collision portion of the second stencil aperture region $B1_1$ is cropped off to obtain a third stencil aperture region $B2_1$, a collision portion of the second stencil aperture region $B1_2$ is cropped off to obtain a third stencil aperture region $B2_2$, and a collision portion of the second stencil aperture region $B1_3$ is cropped off to obtain a third stencil aperture region $B2_3$.

Step 3.7, it is determined whether the first area ratio associated with the third stencil aperture region $B2_1$ is greater than 0.66, the width-to-thickness ratio associated with the third stencil aperture region $B2_1$ is greater than 1.5, the second area ratio associated with the third stencil aperture region $B2_1$ is greater than 50%, the size ratio associated with the third stencil aperture region $B2_1$ is greater than 50%, and the ratio of the area of the third stencil aperture region $B2_1$ to the area of the second stencil aperture region $B1_1$ is less than 20%. The judgment process of the third stencil aperture region $B2_2$ and the third stencil aperture region $B2_3$ is similar to that of the third stencil aperture region $B2_1$.

Figure 5E:
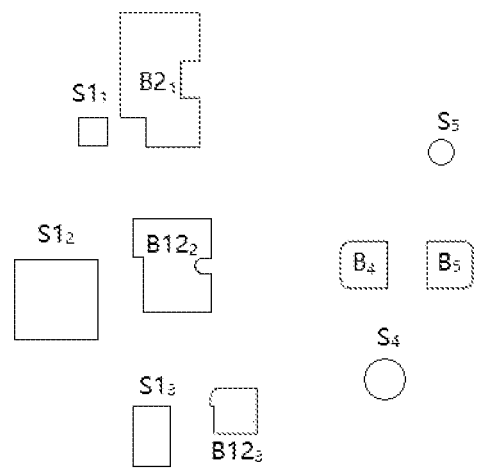
Figure 5F:
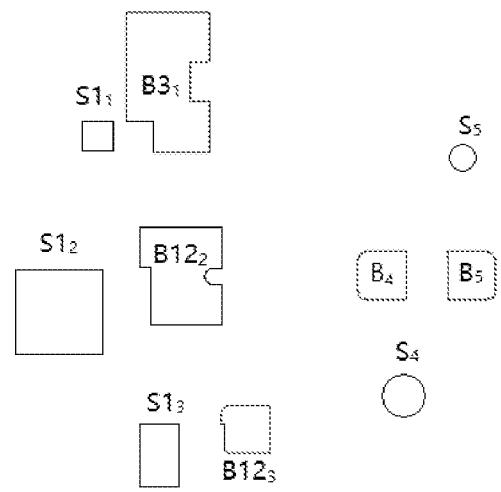

Step 3.8, if the conditions in step 3.7 are all satisfied by a third stencil aperture region, this third stencil aperture region is used to replace the corresponding first stencil aperture region that is unmodified. As shown in FIG. 5e, the third stencil aperture region $B2_2$ and the third stencil aperture region $B2_3$ satisfy the conditions in step 3.7, the third stencil aperture region $B2_2$ is used as a new stencil aperture region $B12_2$ to replace the first stencil aperture region $B_2$, and the third stencil aperture region $B2_3$ is used as a new stencil aperture region $B12_3$ to replace the first stencil aperture region $B_3$.

Figure 6A:
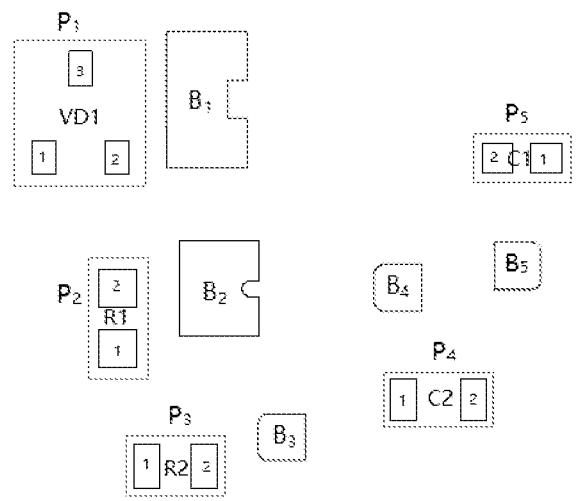
FIGS. 6a-6h are schematic diagrams of a process of a stencil-avoidance design method involving device bodies according to an embodiment of the present disclosure.

Step 3.9, for one of third stencil aperture regions, if any of the conditions in step 3.7 is not satisfied, the third stencil aperture region needs to be graphically modified. The modification process of the third stencil aperture region is as follows: the size of the third stencil aperture region is first modified (e.g., reduced by 5%), and then the position of the third stencil aperture region is modified (e.g., the third stencil aperture region moves for a specified distance in a direction pointing from the device body to the third stencil aperture region, e.g., the specified distance is 0.001 mm), and then the shape of the third stencil aperture is modified (e.g., the length and/or width of the third stencil aperture $B2_1$ is adjusted minutely, for example, a ratio of the adjustment to the original length or width is within a threshold range (e.g., 0.5%-10%)) to generate a new stencil aperture region. In an embodiment, a shortest distance between the third stencil aperture region $B2_1$ and the solder resist $S1_1$ in FIG. 5e is so short that there is a large notch on the third stencil aperture region $B2_1$, which in turn makes the width-to-thickness ratio of the third stencil aperture region $B2_1$ fail to satisfy the first condition, then the third stencil aperture region $B2_1$ needs to be graphically modified. In FIG. 6f, the stencil aperture region $B3_1$ is obtained by moving the third stencil aperture region $B2_1$ by the specified distance in the direction pointing from the solder resist $S1_1$ to the third stencil aperture region $B2_1$, and increasing the width of the third stencil aperture region $B2_1$ to meet the threshold range (e.g., 0.5%-10%).

Figure 5G:
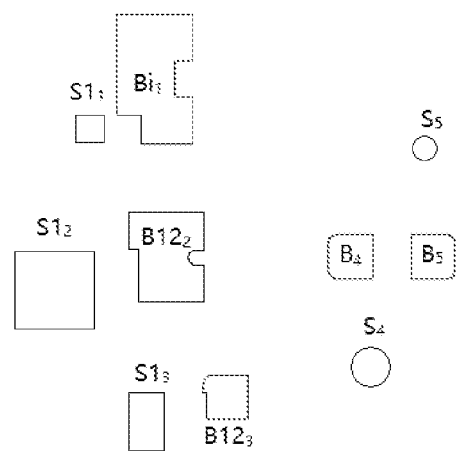

Step 3.10, step 3.7 is performed on the graphically processed third stencil aperture region obtained in step 3.9. If the graphically processed third stencil aperture region obtained in step 3.9 does not satisfy the conditions in step 3.7, step 3.9 is performed again. Step 3.7, step 3.8, and step 3.9 are performed repeatedly until a new stencil aperture region Bi (the value of i starts from 2, and i<20) is generated. When i=20, steps 3.7 to 3.9 are no longer repeated and the loop ends. As shown in FIG. 5g, a new stencil aperture region $Bi_1$ is generated.

Figure 5H:
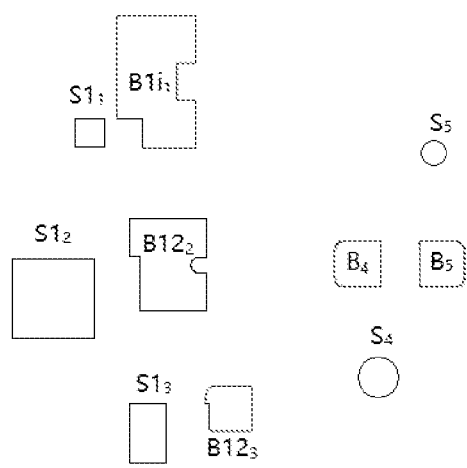

Step 3.11, if the conditions in step 3.7 are all satisfied, the first stencil aperture $B_1$ is replaced with the new stencil aperture region Bi. As shown in FIG. 5h, the first stencil aperture $B_1$ is replaced with the stencil aperture region $B1i_1$.

Step 3.12, record all the new stencil aperture region Bi that do not satisfy the conditions in step 3.7 when i has reached 20, and return them to a window for avoidance analysis in the form of a report, and coordinate positions of the recorded new stencil aperture regions are displayed for manual reviewing and modification.

Embodiment 4

Referring to FIGS. 6a-6h. FIGS. 6a-6h are schematic diagrams of the stencil-avoidance design method involving device bodies according to an embodiment of the present disclosure. On the basis of the above-mentioned embodiments, the embodiment takes the first regions being the device bodies as an example to illustrate the process. The process specifically includes the following steps:

Step 4.1, PCB design data is read and then preprocessed to obtain the region data of the PCB, such as, data of through-holes, data of solder resist regions, data of profiles (i.e., outer frames of the PCB), data of device bodies, data of device coordinates and data of device package, etc. The data of solder coatings is first generated based on the data of device package, and then the stencil aperture regions are created (or designed) for different types of devices based on the data of solder coatings. As shown in FIG. 6a, there are five device bodies (including a device body $P_1$, a device body $P_2$, a device body $P_3$, a device body $P_4$, and a device body $P_5$) and five first stencil aperture regions (including a first stencil aperture region $B_1$, a first stencil aperture region $B_2$, a first stencil aperture region $B_3$, a first stencil aperture region $B_4$, and a first stencil aperture region $B_5$) that need avoidance analysis.

Figure 6B:
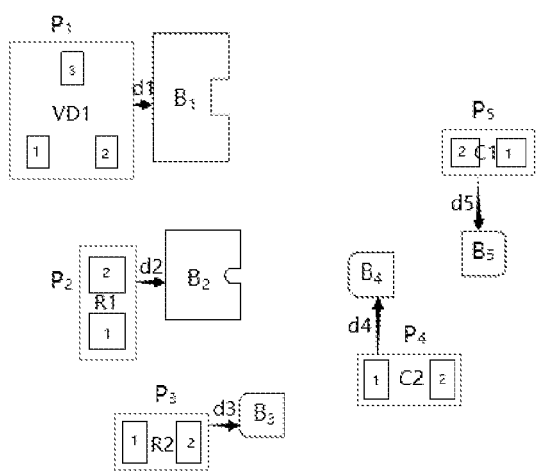

Step 4.2, as shown in FIG. 6b, the distances between a selected device body ($P_1$, $P_2$, $P_3$, $P_4$, or $P_5$) and five first stencil aperture regions ($B_1$, $B_2$, $B_3$, $B_4$, and $B_5$) are measured respectively, and the shortest distance between the selected device body ($P_1$, $P_2$, $P_3$, $P_4$, or $P_5$) and the five first stencil aperture regions is determined from the distances. The shortest distance between the selected device body and five first stencil aperture regions is noted as an AB spacing. It is determined whether the shortest distance between the selected device body and the five first stencil aperture regions is within the preset threshold range, i.e., whether the shortest distance (i.e., the AB spacing) is greater than 0 and less than 0.2 mm.

Step 4.3, if the shortest distance between the selected device body and any of the five first stencil aperture regions is within the preset threshold range (for example, 0 to 0.2 mm), the first stencil aperture region closest to the selected device body is used as a second stencil aperture region. As shown in FIG. 6b, d1 represents a measured distance between the device body $P_1$ and the first stencil aperture region $B_1$ and is shorter than the distances between the device body $P_1$ and other first stencil aperture regions ($B_2$, $B_3$, $B_4$, and $B_5$), d1=0.07 mm i.e., d1 is the shortest distance between the device body $P_1$ and the five first stencil aperture regions($B_1$, $B_2$, $B_3$, $B_4$, and $B_5$); d2 represents a measured distance between the device body $P_2$ and the first stencil aperture region $B_2$ and is shorter than the distances between the device body $P_2$ and other first stencil apertures ($B_1$, $B_3$, $B_4$, and $B_5$), d2=0.15 mm, i.e., d2 is the shortest distance between the device body $P_2$ and the five first stencil aperture regions ($B_1$, $B_2$, $B_3$, $B_4$, and $B_5$); d3 represents a measured distance between the device body P3 and the first stencil aperture region $B_3$ and is shorter than the distances between the device body $P_3$ and other first stencil apertures ($B_1$, $B_2$, $B_4$, and $B_5$), d3=0.18 mm, i.e., d3 is the shortest distance between the device body $P_3$ and the five first stencil aperture regions ($B_1$, $B_2$, $B_3$, $B_4$, and $B_5$); d4 represents a measured distance between the device body $P_4$ and the first stencil aperture region $B_4$ and is shorter than the distances between the device body $P_4$ and other first stencil apertures ($B_1$, $B_2$, $B_3$, and $B_5$), d4=0.3 mm, i.e., d4 is the shortest distance between the device body $P_4$ and the five first stencil aperture regions ($B_1$, $B_2$, $B_3$, $B_4$, and $B_5$); d5 represents a measured distance between the device body $P_5$ and the first stencil aperture region $B_5$ and is shorter than the distances between the device body $P_5$ and other first stencil apertures ($B_1$, $B_2$, $B_3$, and $B_4$), d5=0.33 mm, i.e., d5 is the shortest distance between the device body $P_5$ and the five first stencil aperture regions ($B_1$, $B_2$, $B_3$, $B_4$, and $B_5$). Because d1, d2, and d3 are all within the preset threshold range, the first stencil aperture region $B_1$, the first stencil aperture region $B_2$, and the first stencil aperture region $B_3$ are directly used as a second stencil aperture region $B1_1$, a second stencil aperture region $B1_2$, and a second stencil aperture region $B1_3$ respectively in FIG. 6c.

Step 4.4, if the distance between the selected device body and a selected first stencil aperture region is not within the preset threshold range, the selected first stencil aperture region remains unchanged. For example, as shown in FIG. 6b, the distance between the device body $P_4$ and the first stencil aperture region $B_4$, and the distance between the device body $P_5$ and the first stencil aperture region $B_5$ in FIG. 6b are not within the preset threshold range, the first stencil aperture region $B_4$ and the first stencil aperture region $B_5$ remain unchanged.

Figure 6C:
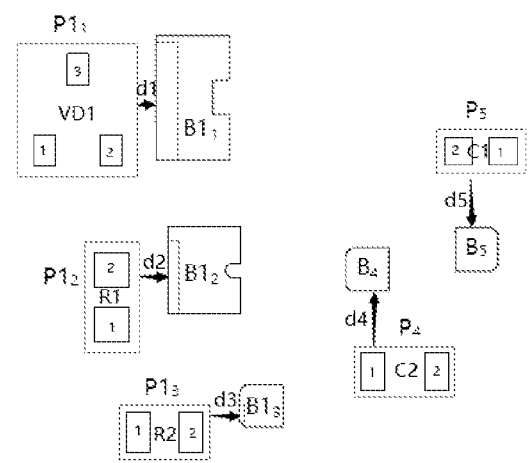

Step 4.5, if the shortest distance between the selected device body and a selected first stencil aperture region of the five first stencil aperture regions in step 4.2 is within the preset threshold range(at which time the selected first stencil aperture region is the second stencil aperture region), the selected device body is expanded to a specified distance (e.g., 0.2 mm) in a direction pointing from the selected device body to the second stencil aperture region. The external expansion refers that an edge of the selected device body facing the second stencil aperture region is expanded to the specified distance in the direction pointing from the selected device body to the second stencil aperture region. A collision test is performed on the selected device body after external expansion (i.e., the third region) and the second stencil aperture region. The portion of the second stencil aperture region that overlaps with the selected device body after external expansion (i.e., the third region) is defined as a collision portion. In FIG. 6c, a device body $P1_1$ is obtained by expanding the device body $P_1$, a device body $P1_2$ is obtained by expanding the device body $P_2$, and a device body $P1_3$ is obtained by expanding the device body $P_3$. FIG. 6c shows that a collision portion between the device body $P1_1$ and the second stencil aperture region $B1_1$, a collision portion between the device body $P1_2$ and the second stencil aperture region $B1_2$, and a collision portion between the device body $P1_3$ and the second stencil aperture region $B1_3$.

Figure 6D:
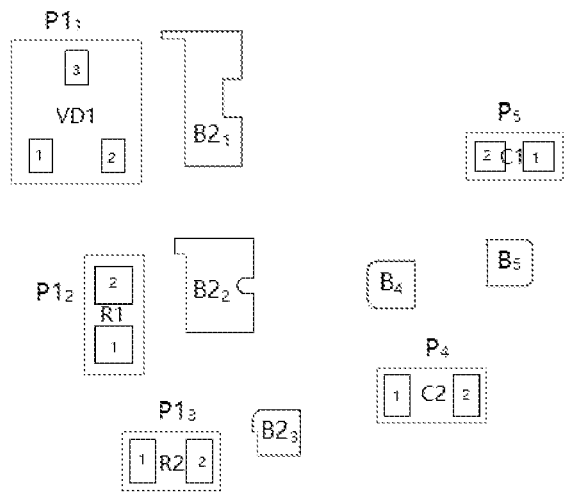

Step 4.6, if a collision occurs, a collision portion of the corresponding second stencil aperture region is cropped off to obtain a third stencil aperture region. Herein, the collision portion of Step 4.6 is the portion of the second stencil aperture region that overlaps with the device body after external expansion. As shown in FIG. 6c and FIG. 6d, a collision portion of the second stencil aperture region $B1_1$ is cropped off to obtain a third stencil aperture region $B2_1$, a collision portion of the second stencil aperture region $B1_2$ is cropped off to obtain a third stencil aperture region $B2_1$, and a collision portion of the second stencil aperture region $B1_3$ is cropped off to obtain a third stencil aperture region $B2_1$.

Step 4.7, it is determined whether the first area ratio associated with the third stencil aperture region $B2_1$ is greater than 0.66, the width-to-thickness ratio associated with the third stencil aperture region $B2_1$ is greater than 1.5, the second area ratio associated with the third stencil aperture region $B2_1$ is greater than 50%, the size ratio associated with the third stencil aperture region $B2_1$ is greater than 50%, and the ratio of the area of the third stencil aperture region $B2_1$ to the area of the second stencil aperture region $B1_1$ is less than 20%. The judgment process of the third stencil aperture region $B2_2$ and the third stencil aperture region $B2_3$ is similar to that of the third stencil aperture region $B2_1$.

Figure 6E:
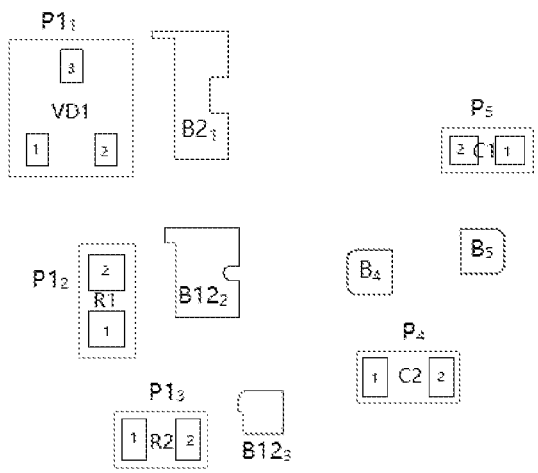
Figure 6F:
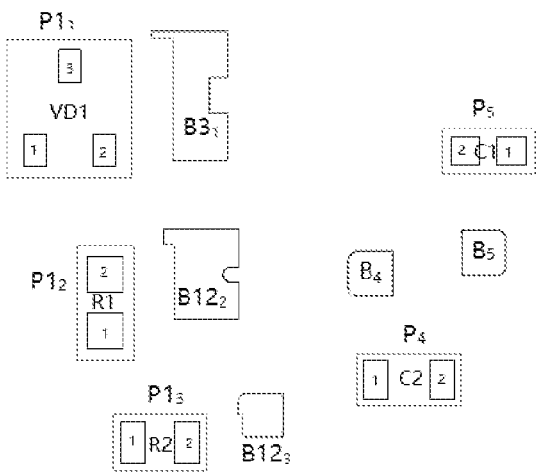

Step 4.8, if the conditions in step 4.7 are all satisfied by a third stencil aperture region, this third stencil aperture region is used to replace the corresponding first stencil aperture region that is unmodified. As shown in FIG. 6e, the third stencil aperture region $B2_2$ and the third stencil aperture region $B2_3$ satisfy the conditions in step 4.7, the third stencil aperture region $B2_2$ is used as a new stencil aperture region $B12_2$ to replace the first stencil aperture region $B_2$, and the third stencil aperture region $B_23$ is used as a new stencil aperture region $B12_3$ to replace the first stencil aperture region $B_3$.

Step 4.9, for one of third stencil aperture regions, if any of the conditions in step 4.7 is not satisfied, the third stencil aperture region needs to be graphically modified. The modification process of the third stencil aperture region is as follows: the size of the third stencil aperture region is first modified (e.g., reduced by 5%), and then the position of the third stencil aperture region is modified (e.g., the third stencil aperture region moves for a specified distance in a direction pointing from the device body to the third stencil aperture region, e.g., the specified distance is 0.001 mm), and the shape of the third stencil aperture is modified (e.g., the length and/or width of the third stencil aperture $B2_1$ is adjusted minutely, for example, a ratio of the adjustment to the original length or width is within a threshold range (e.g., 0.5%-10%)) to generate a new stencil aperture region. In an embodiment, a shortest distance between the third stencil aperture region $B2_1$ and the device body $P1_1$ in FIG. 6e is so short that there is a large notch on the third stencil aperture region $B2_1$, which in turn makes the width-to-thickness ratio of the third stencil aperture region $B2_1$ fail to satisfy the first condition, then the third stencil aperture region $B2_1$ needs to be graphically modified. In FIG. 6f, the stencil aperture region $B3_1$ is obtained by moving the third stencil aperture region $B2_1$ by the specified distance in the direction pointing from the device body $P1_1$ the third stencil aperture region $B2_1$, and increasing the width of the third stencil aperture region $B2_1$ to meet the threshold range (e.g., 0.5%-10%).

Figure 6G:
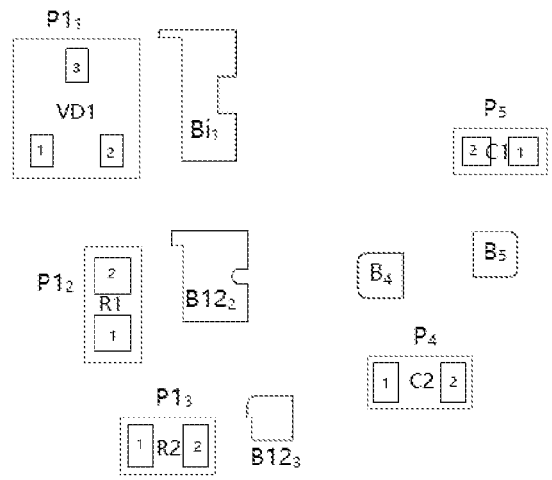

Step 4.10, step 4.7 is performed on the graphically processed stencil aperture regions obtained in step 4.9. if the graphically processed third stencil aperture region obtained in step 4.9 does not satisfy the conditions in step 4.7, step 4.9 is performed again. Step 4.7, step 4.8 and step 4.9 are performed repeatedly until a new stencil aperture region $Bi_1$ (the value of i starts from 2, and i<20) is generated. When i=20, steps 4.7 to 4.9 are no longer repeated and the loop ends. As shown in FIG. 6g, a new stencil aperture region $Bi_1$, is generated.

Figure 6H:
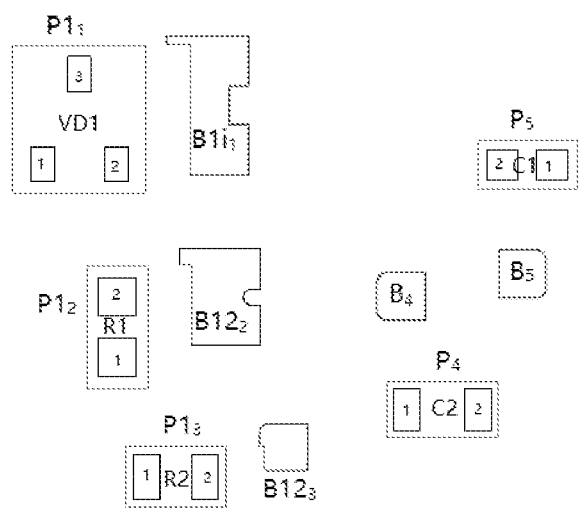

Step 4.11, if the conditions in step 4.7 are all satisfied, the first stencil aperture $B_1$ is replaced with the new stencil aperture region Bi. As shown in FIG. 6h, the first stencil aperture $B_1$ is replaced with the stencil aperture region $B1i_1$.

Step 4.12, record all the new stencil aperture region Bi (i=20) does not satisfy the conditions in step 4.7 when i has reached 20, and return them to a window for avoidance analysis in the form of a report, and coordinate positions of the recorded new stencil aperture regions are displayed for manual reviewing and modification.

Embodiment 5

Figure 7:
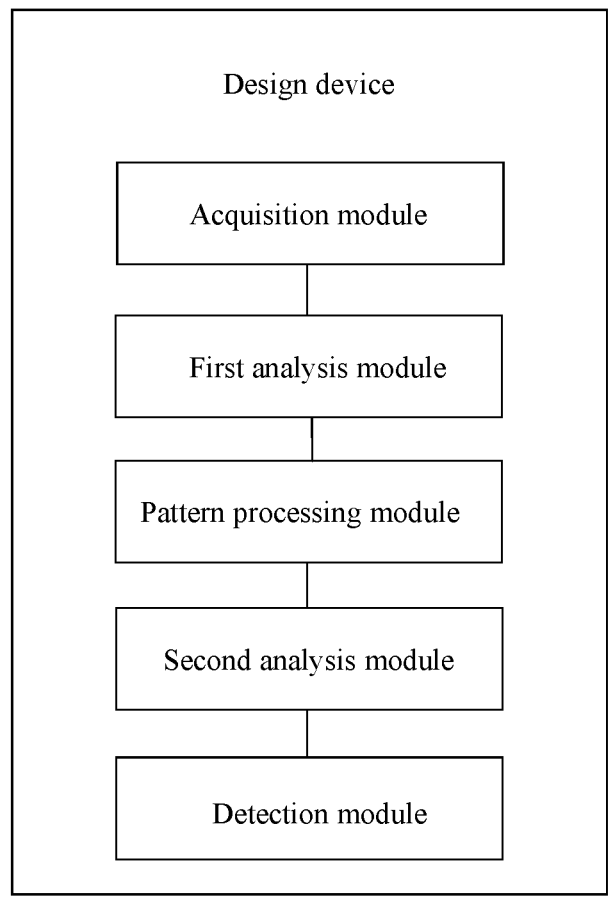
FIG. 7 is a schematic structural diagram of a stencil-avoidance design device according to an embodiment of the present disclosure.

Referring to FIG. 7. FIG. 7 is a schematic structural diagram of a stencil-avoidance design device according to an embodiment of the present disclosure. The stencil-avoidance design device includes an acquisition module, a first analysis module, a region processing module, a second analysis module, and a detection module.

The acquisition module is used to obtain a plurality of first regions and a plurality of first stencil aperture regions.

The first analysis module is used to determine whether a shortest distance between a selected first region of the plurality of first regions and a selected first stencil aperture region f the plurality of first stencil aperture regions is within a preset threshold range, and use the selected first region as a second region and use the selected first stencil aperture region as a second stencil aperture region if the shortest distance is within the preset threshold range.

The region processing module is used to obtain a third region based on the second region; wherein a collision test is performed on the third region and with the second stencil aperture region.

The second analysis module is used to determine whether the third region collides with the second stencil aperture region, and cropping the second stencil aperture region to obtain a third stencil aperture region if the third region collides with the second stencil aperture region.

The detection module is used to obtain a final stencil aperture region according to a first area ratio, a width-to-thickness ratio, a second area ratio, and a size ratio of the third stencil aperture region, and a relationship between an area of the third stencil aperture region and an area of the second stencil aperture region.

This embodiment provides the stencil-avoidance design device that can perform the methods described above with similar implementation principles and technical effects.

Embodiment 6

Figure 8:
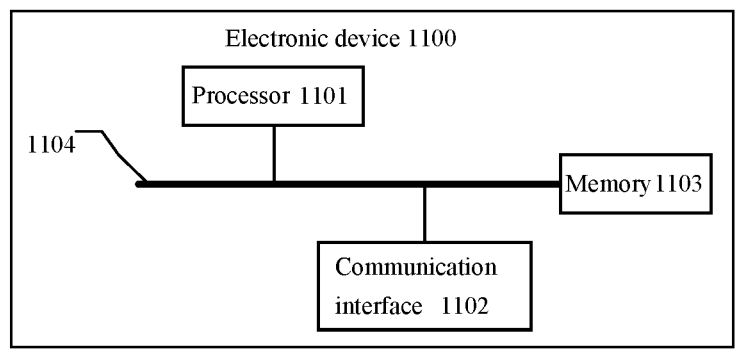
FIG. 8 is a schematic structural diagram of an electronic device according to an embodiment of the present disclosure.

Referring to FIG. 8. FIG. 8 is a schematic structural diagram of an electronic device according to an embodiment of the present disclosure. The electronic device 1100 includes a processor 1101, a communication interface 1102, a memory 1103, and a communication bus 1104. The processor 1101, the communication interface 1102, and the memory 1103 are communicated with each other through the communication bus 1104.

The memory 1103 is used to store a computer program.

The processor 1101 is used to implement the method described above when executing the computer program.

The processor 1101 implements the following steps when executing the computer program.

Step 1.1, obtaining a plurality of first regions and a plurality of first stencil aperture regions.

Step 1.2, determining whether a shortest distance between a selected first region of the plurality of first regions and a selected first stencil aperture region of the plurality of first stencil aperture regions is within a preset threshold range, and using the selected first region as a second region and using the selected first stencil aperture region as a second stencil aperture region if the shortest distance is within the preset threshold range.

Step 1.3, obtaining a third region based on the second region, wherein a collision test is performed on the third region and the second stencil aperture region.

Step 1.4, determining whether the third region collides with the second stencil aperture region, and cropping the second stencil aperture region to obtain a third stencil aperture region if the third region collides with the second stencil aperture region.

Step 1.5, obtaining a final stencil aperture region according to a first area ratio, a width-to-thickness ratio, a second area ratio, and a size ratio of the third stencil aperture region, and a relationship between an area of the third stencil aperture region and an area of the second stencil aperture region.

The present embodiment provides the electronic device that can perform the methods described above with similar implementation principles and technical effects.

Embodiment 7

The present embodiment provides a computer readable storage medium; the computer readable storage medium stores a computer program, and the computer program implements the method described above when executed by the processor:

Step 1.1, obtaining a plurality of first regions and a plurality of first stencil aperture regions.

Step 1.2, determining whether a shortest distance between a selected first region of the plurality of first regions and a selected first stencil aperture region of the plurality of first stencil aperture regions is within a preset threshold range, and using the selected first region as a second region and using the selected first stencil aperture region as a second stencil aperture region if the shortest distance is within the preset threshold range.

Step 1.3, obtaining a third region based on the second region, wherein a collision test is performed on the third region and the second stencil aperture region.

Step 1.4, determining whether the third region collides with the second stencil aperture region, and cropping the second stencil aperture region to obtain a third stencil aperture region if the third region collides with the second stencil aperture region.

Step 1.5, obtaining a final stencil aperture region according to a first area ratio, a width-to-thickness ratio, a second area ratio, and a size ratio of the third stencil aperture region, and a relationship between an area of the third stencil aperture region and an area of the second stencil aperture region.

The present embodiment provides the computer readable storage medium that can perform the methods described above with similar implementation principles and technical effects.

It should be understood by those skilled in the art that embodiments of the present disclosure may be provided as methods, devices (apparatus), or computer program products. Accordingly, the present disclosure may adopt an entirely hardware embodiment, an entirely software embodiment, or an embodiment combining software and hardware, all of which are collectively referred to herein as a "module" or "system". Further, the present disclosure may adopt computer program products implemented on one or more computer-readable storage medium (including, but not limited to, disk memory, CD-ROM, optical memory, etc.) that stores the computer-usable program code. The computer program is stored/distributed in a suitable medium, provided with or as part of other hardware, and may also take other forms of distribution, such as via the Internet or other wired or wireless telecommunications systems.

In the description of the present disclosure, it should be understood that the terms "first" and "second" are used for descriptive purposes only and can not be understood as indicating or implying relative importance or implicitly specifying the number of technical features indicated. Thus, the features qualified with "first" and "second" may explicitly or implicitly include one or more such features. In the description of the present disclosure, "plurality" means two or more, unless otherwise expressly and specifically limited.

In the description of the present specification, reference is made to the terms "an embodiment," "some embodiments," "example," "specific example", or "some examples," etc., means that the specific features, structures, materials, or characteristics described in connection with the embodiment or example are included in at least one embodiment or example of the present disclosure. In this specification, the schematic representation of the above terms need not be directed to the same embodiment or example. Moreover, the specific features, structures, materials, or characteristics described may be combined in a suitable manner in any one or more embodiments or examples. In addition, those skilled in the art may join and combine the different embodiments or examples described in this specification.

The foregoing is a further detailed description of the present disclosure in connection with specific preferred embodiments, and it cannot be concluded that specific embodiments of the present disclosure are limited to these descriptions. For a person of ordinary skill in the art to which the present disclosure belongs, a number of simple derivations or substitutions can be made without departing from the conception of the present disclosure, all of which should be considered as falling within the scope of protection of the present disclosure.

What is claimed is:

1. A stencil-avoidance design method, comprising:
   obtaining a plurality of first regions and a plurality of first stencil aperture regions;
   determining whether a shortest distance between a selected first region of the plurality of first regions and a selected first stencil aperture region of the plurality of first stencil aperture regions is within a preset threshold range, and using the selected first region as a second region and using the selected first stencil aperture region as a second stencil aperture region if the shortest distance is within the preset threshold range;
   obtaining a third region based on the second region;
   determining whether the third region collides with the second stencil aperture region, and cropping the second stencil aperture region to obtain a third stencil aperture region if the third region collides with the second stencil aperture region; and
   obtaining a final stencil aperture region according to a first area ratio, a width-to-thickness ratio, a second area ratio, and a size ratio of the third stencil aperture region, and a relationship between an area of the third stencil aperture region and an area of the second stencil aperture region.

2. The stencil-avoidance design method according to claim 1, wherein the step of obtaining the third region based on the second region comprises:
   obtaining the third region through expanding or contracting the second region along a preset direction; wherein the preset direction is a direction pointing from the second region to the second stencil aperture region.

3. The stencil-avoidance design method according to claim 2, wherein the step of cropping the second stencil aperture region to obtain the third stencil aperture region comprises:
   cropping off a collision portion of the second stencil aperture region to obtain the third stencil aperture region so that the third stencil aperture region does not collide with the third region.

4. The stencil-avoidance design method according to claim 3, wherein the first area ratio is a ratio of the area of the third stencil aperture region to an area of aperture walls corresponding to the third stencil region, and the second area ratio is a ratio of the area of the third stencil aperture region to the area of the second stencil aperture region.

5. The stencil-avoidance design method according to claim 4, wherein the step of obtaining the final stencil aperture region according to the first area ratio, the width-to-thickness ratio, the second area ratio, and the size ratio of the third stencil aperture region, and the ratio of the area of the third stencil aperture region to the area of the second stencil aperture region comprises:
   step 1.51, determining whether the first area ratio, the width-to-thickness ratio, the second area ratio, the size ratio of the third stencil aperture region, and the relationship between the area of the third stencil aperture region and the area of the second stencil aperture region satisfies a first condition, a second condition, and a third condition; wherein the first condition is that the first area ratio is greater than a first threshold and the width-to-thickness ratio is greater than a second threshold, the second condition is that the relationship between the area of the third stencil aperture region and the area of the second stencil aperture region is less than a third threshold, and the third condition is that the second area ratio is greater than a fourth threshold and the size ratio is greater than a fifth threshold;
   step 1.52, processing a corresponding third stencil aperture region in a preset manner to obtain a graphically processed third stencil aperture region, if all of the first condition, the second condition, and the third condition are not satisfied;
   step 1.53, performing step 1.51 and step 1.52 on the graphically processed third stencil aperture region, after which graphical processing is performed for N times on the third stencil aperture region and/or the graphically processed third stencil aperture region, wherein the final stencil aperture region is obtained according to the third stencil aperture region graphical if N is not greater than a preset threshold and the third stencil aperture region after N times of graphical processing satisfies the first condition, the second condition, and the third condition; wherein a fourth stencil aperture region is obtained if N is equal to the preset threshold and the third stencil aperture regions after N times of graphical processing does not satisfy all of the first condition, the second condition, and the third condition; wherein N is a positive integer; and step 1.54, modifying the fourth stencil aperture region to obtain the final stencil aperture region.

6. The stencil-avoidance design method according to claim 5, wherein the preset manner comprises at least one of a size adjustment manner, a position adjustment manner, and a shape adjustment manner.

7. The stencil-avoidance design method according to claim 6, wherein the step of processing the third stencil aperture region in the preset manner to obtain the graphically processed third stencil aperture region comprises:

processing the third stencil aperture region in the preset manner to obtain the graphically processed third stencil aperture region according to a preset order, where the size adjustment manner has a higher priority than the position adjustment manner, and the position adjustment manner has a higher priority than the shape adjustment manner.

8. The stencil-avoidance design method according to claim 1, wherein one of the first regions comprises at least one of a through-hole region, a solder resist region, a profile region, and a device body region.

9. An electronic device, comprising: a processor, a communication interface, a memory and a communication bus, wherein the processor, the communication interface, and the memory are communicated with each other through the communication bus;

a memory, used to store a computer program; and
a processor, used to implement the method of claim 1 when executing the computer program.

10. A non-transitory storage medium, wherein the non-transitory storage medium stores a computer program, and the computer program implements the method of claim 1 when executed by the processor.

11. A stencil-avoidance design device, comprising:
an acquisition module, used to obtain a plurality of first regions and a plurality of first stencil aperture regions;
a first analysis module, used to determine whether a shortest distance between a selected first region of the plurality of first regions and a selected first stencil aperture region f the plurality of first stencil aperture regions is within a preset threshold range, and use the selected first region as a second region and use the selected first stencil aperture region as a second stencil aperture region if the shortest distance is within the preset threshold range;
a region processing module, used to obtain a third region based on the second region; wherein a collision test is performed on the third region and the second stencil aperture region;
a second analysis module, used to determine whether the third region collides with the second stencil aperture region, and cropping the second stencil aperture region to obtain a third stencil aperture region if the third region collides with the second stencil aperture region; and
a detection module, used to obtain a final stencil aperture region according to a first area ratio, a width-to-thickness ratio, a second area ratio, and a size ratio of the third stencil aperture region, and a relationship between an area of the third stencil aperture region and an area of the second stencil aperture region.

* * * * *